US011979258B2

(12) United States Patent
Collotta et al.

(10) Patent No.: US 11,979,258 B2
(45) Date of Patent: May 7, 2024

(54) RECONFIGURABLE RECEIVER FOR WIRELESS COMMUNICATION NETWORKS

(71) Applicants: Telecom Italia S.p.A., Milan (IT); Politecnico di Torino, Turin (IT)

(72) Inventors: Ivano Collotta, Turin (IT); Gian Michele Dell'aera, Turin (IT); Roberto Fantini, Turin (IT); Bruno Melis, Turin (IT); Marina Mondin, Turin (IT)

(73) Assignees: Telecom Italia S.p.A., Milan (IT); Politecnico di Torino, Turin (IT)

( * ) Notice: Subject to any disclaimer, the term of this patent is extended or adjusted under 35 U.S.C. 154(b) by 335 days.

(21) Appl. No.: 17/299,853

(22) PCT Filed: Nov. 28, 2019

(86) PCT No.: PCT/EP2019/082980
§ 371 (c)(1),
(2) Date: Jun. 4, 2021

(87) PCT Pub. No.: WO2020/114885
PCT Pub. Date: Jun. 11, 2020

(65) Prior Publication Data
US 2022/0116245 A1    Apr. 14, 2022

(30) Foreign Application Priority Data

Dec. 5, 2018 (IT) .................. 102018000010814

(51) Int. Cl.
*H04L 25/02* (2006.01)
*H04B 17/345* (2015.01)
(Continued)

(52) U.S. Cl.
CPC ....... *H04L 25/0204* (2013.01); *H04B 17/345* (2015.01); *H04L 25/022* (2013.01);
(Continued)

(58) Field of Classification Search
CPC ............ H04L 25/0204; H04L 25/022; H04L 25/0224; H04L 25/0256; H04L 25/08; H04L 25/067
See application file for complete search history.

(56) References Cited

U.S. PATENT DOCUMENTS

2008/0123760 A1* 5/2008 Oh .................. H04B 1/1027
714/699
2014/0355708 A1   12/2014 Kang et al.
(Continued)

FOREIGN PATENT DOCUMENTS

WO    2016/082040 A1    6/2016

OTHER PUBLICATIONS

Mar. 12, 2020—(WO) ISR and Written Opinion—App PCT/EP2019/082980.

*Primary Examiner* — Derrick V Rose
(74) *Attorney, Agent, or Firm* — Banner & Witcoff, Ltd.

(57) ABSTRACT

A receiver adapted to receive a modulated signal including useful and interfering signals and to detect information bits carried thereon. The modulated signal comprises signal components each one associated with a respective modulation subcarrier and including respective useful and interfering signal components. The receiver may include a first estimation unit providing a respective first useful signal component estimate indicative of the useful signal component for each signal component; a second estimation unit providing a respective second useful signal component estimate indicative of the useful signal component for each signal component; a channel estimation unit estimating, for each signal component, a first channel frequency response associated with the respective useful signal component and a second channel frequency response associated with the respective interfering signal component; and a control unit determining, for each signal component, an interference
(Continued)

Figure 1:
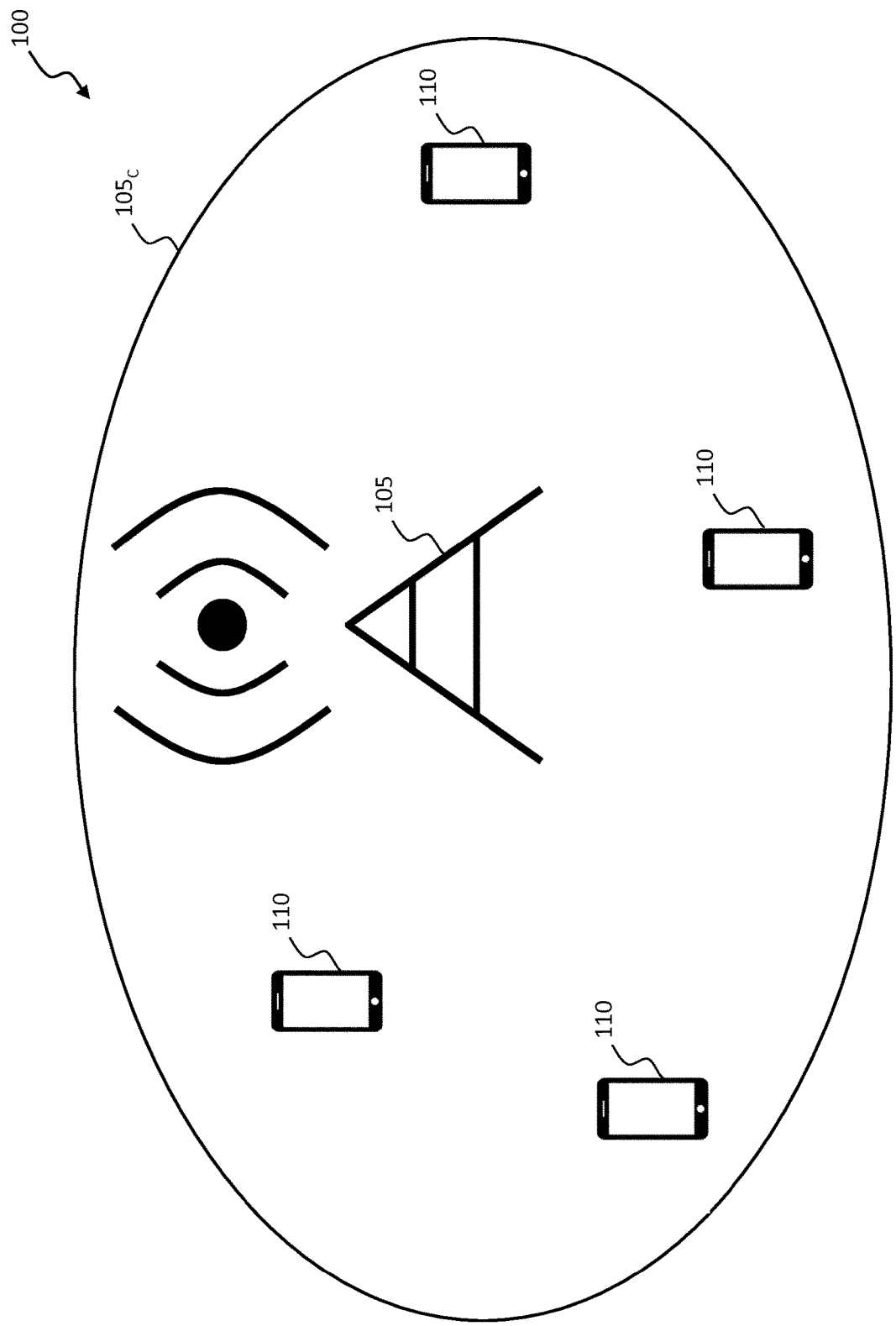

level experienced by that signal component according to respective first and second channel frequency responses.

20 Claims, 7 Drawing Sheets

(51) Int. Cl.
*H04L 25/08* (2006.01)
*H04L 25/06* (2006.01)

(52) U.S. Cl.
CPC ...... *H04L 25/0224* (2013.01); *H04L 25/0256* (2013.01); *H04L 25/08* (2013.01); *H04L 25/067* (2013.01)

(56) References Cited

U.S. PATENT DOCUMENTS

2015/0003573 A1* 1/2015 Fechtel .................... H04B 1/12
375/348
2015/0282192 A1 10/2015 Shin et al.
2017/0324462 A1* 11/2017 Chen ........................ H04B 7/08

* cited by examiner

RECONFIGURABLE RECEIVER FOR WIRELESS COMMUNICATION NETWORKS

BACKGROUND OF THE INVENTION

Field of the Invention

The present invention generally relates to a receiver for wireless communication networks. More particularly, the present invention relates to a receiver providing cancellation of the co-channel interference coming from a serving network node (i.e. intra-cell interference) and/or from adjacent network nodes (inter-cell interference) based on "Network Assisted Interference Cancellation and Suppression" (NAICS) technology.

Overview of the Related Art

An evolution of the wireless communication networks, e.g. those compliant with LTE/LTE-Advanced standards, is the possibility of exploiting a combination of OFDM and MIMO techniques for transmission. According to OFDM technique, bits to be transmitted are split into bits sequences, then the bits sequences are modulated by separate and reciprocally orthogonal subcarriers (also referred to as OFDM subcarriers) and multiplexed into OFDM symbols for transmission. According to MIMO technique, multiple OFDM symbols are transmitted/received via multiple transmitting/receiving antennas.

As known, spectral efficiency of modern wireless communication networks is severely limited by inter-cell interference and intra-cell interference, especially for users located at cell edges. For this reason, modern wireless communication networks provide transmission of the OFDM symbols by means of transmission techniques that exploit the availability of multiple transmitting/receiving antennas, such as SFBC ("Space Frequency Block Coding") or STBC ("Space Time Block Coding") transmission techniques (e.g., in case of two transmitting antennas), SFBC-FSTD ("SFBC-Frequency Switching Transmit Diversity") transmission technique (e.g., in case of four transmitting antennas), "Spatial Multiplexing" transmission technique, "Precoding" transmission technique, or any combination of these transmission techniques.

These transmission techniques require additional computational capabilities in order to correctly detect, at user equipment side, the transmitted bits.

This is exacerbated in modern scenarios, wherein the growing number of users in the wireless communication network, as well as the growing demand for services requiring very high data traffic (such as internet, multimedia and real-time services) and the evolution of mobile applications, require higher and higher user data rates.

"Network Assisted Interference Cancellation and Suppression" (NAICS) technology has been actively studied in 3GPP (Third Generation Partnership Project) as it represents an alternative and more effective approach to blind interference cancellation techniques typically implemented at user equipment side (i.e., at a receiver of the user equipment). The basic principle behind NAICS technology is the exchange, between neighboring network nodes, of information about respective network cell configurations, and higher layer signaling from a serving network node to the served user equipment of this information; in doing so, thanks to NAICS technology, the serving network node may aid the user equipment in interference cancellation and suppression by providing the user equipment with additional information on scheduled transmissions, thus enhancing the performance of interference cancellation.

NAICS technology determines relevant performance improvement, however it determines also a significant signalling overhead and, hence, a significant signal processing complexity at the receiver.

US2015/0282192 A1 discloses a method for receiving downlink data by a User Equipment (UE) in a wireless communication system. The method includes checking a transmission parameter related to data transmitted from an interfering cell, determining presence/absence of an interference signal based on the transmission parameter, determining whether to apply Network Assisted Interference Cancellation and Suppression (NAICS) technology based on at least one of the transmission parameter or the presence/absence of the interference signal, and decoding the downlink data depending on whether to apply the NAICS technology.

WO2016/082040 A1 discloses a receiver for demodulating wireless signal using multiple receive antennas. The receiver includes multiple signal detection modules, with each module implementing a non-interference rejection combining signal detection technique. The receiver makes a decision about whether or not to use an interference rejection combining technique, and which signal detection module to use based on the operating conditions of the received signals. When the decision is made to use an interference rejection combining technique, a single whitening filter is used to whiten the received signal prior to sending the whitened signal for processing by the signal detection module. The whitening filter may be calculated as a Cholesky decomposition of an impairment covariance matrix generated from the signals received at the multiple antennas.

SUMMARY OF INVENTION

The Applicant believes that none of the cited prior art solutions is satisfactory for modern technological requirements.

In particular, the Applicant has found that the known solutions involve high computational capabilities and excessive complexity.

According to the Applicant, this is substantially due to the fact that any conventional receiver is based on processing a modulated signal without any consideration about a level of interference experienced by each signal component included in it (or, equivalently, without any consideration about the level of interference experienced by each OFDM subcarrier/OFDM symbol).

The Applicant has also understood that the above issues are exacerbated in modern scenarios, such as those adopting technologies (such as NAICS technology) determining significant signalling overhead.

In view of the above, the Applicant has tackled the problem of increasing the performance of a receiver, and has devised a receiver, advantageously applicable in a network supporting NAICS technology, which is reconfigurable according to a level of interference measured on each OFDM subcarrier/OFDM symbol (thus maximizing user performance while minimizing signal processing complexity).

One or more aspects of the present invention are set out in the independent claims. Advantageous features of the present invention are indicated in the dependent claims, whose wording is enclosed herein verbatim by reference (with any advantageous feature being provided with reference to a specific aspect of the present invention that applies mutatis mutandis to any other aspect thereof).

More specifically, an aspect of the present invention relates to a receiver for receiving a modulated signal including useful and interfering signals and for detecting information bits carried thereon. The modulated signal preferably comprises a plurality of signal components each one associated with a respective modulation subcarrier and including respective useful and interfering signal components. The receiver may comprise:

- a first estimation unit configured to provide, for each signal component, a respective first useful signal component estimate indicative of the useful signal component of that signal component (i.e., the first useful signal component estimate providing a first indication of the useful signal component of that signal component);
- a second estimation unit configured to provide, for each signal component, a respective second useful signal component estimate indicative of the useful signal component of that signal component (i.e., the second useful signal component estimate providing a second indication of the useful signal component of that signal component, the second indication being different from the first indication);
- a channel estimation unit configured to estimate, for each signal component, a first channel frequency response associated with the respective useful signal component and a second channel frequency response associated with the respective interfering signal component;
- a control unit configured to determine, for each signal component, an interference level experienced by that signal component according to the respective first and second channel frequency responses.

The control unit is further configured, for each signal component:

- to cause the second estimation unit to provide the respective second useful signal component estimate from that signal component if the interference level experienced by that signal component is lower than a threshold interference level, or
- to cause the second estimation unit to provide the respective second useful signal component estimate from the first useful signal component estimate provided for that signal component if the interference level experienced by that signal component is higher than the threshold interference level.

The receiver may also comprise a detection unit allowing detection of the information bits carried on the modulated signal according to the second useful signal component estimates provided for the plurality of signal components.

According to an embodiment of the present invention, the receiver supports Network Assisted Interference Cancellation and Suppression signaling for receiving transmission information associated with the modulated signal.

Said transmission information may for example comprise one or more of the following: information on allocated radio resources, modulation and coding scheme, scrambling sequence, transmission technique precoding vector or matrix, and reference signals of an interfering network node or of an interfering user equipment.

According to an embodiment of the present invention, additional or alternative to any of the previous embodiments, for each signal component, if the interference level experienced by that signal component is higher than the threshold interference level, the control unit is configured to cause the first estimation unit to provide the respective first useful signal component estimate based on said transmission information (preferably, by allowing demodulation of the signal component based on said transmission information).

According to an embodiment of the present invention, additional or alternative to any of the previous embodiments, for each signal component, if the interference level experienced by that signal component is between a further threshold interference level and the threshold interference level, the further threshold interference level being advantageously lower than the threshold interference level, the control unit is configured to cause the second estimation unit to provide the respective second useful signal component estimate based on a subset of said transmission information (preferably, by allowing demodulation of the signal component based on a subset of said transmission information).

According to an embodiment of the present invention, additional or alternative to any of the previous embodiments, for each signal component, if the interference level experienced by that signal component is lower than a further threshold interference level, the further threshold interference level being advantageously lower than the threshold interference level, the control unit is configured to cause the second estimation unit to provide the respective second useful signal component estimate without basing on said transmission information (preferably, by allowing demodulation of the signal component without said transmission information).

According to an embodiment of the present invention, additional or alternative to any of the previous embodiments, the receiver further comprises a regeneration unit configured to provide, from the second useful signal component estimates provided for the plurality of signal components, a regenerated useful signal. The regenerated useful signal is preferably a regenerated version of the useful signal included in the modulated signal. The control unit is advantageously configured, preferably in case of a number of detection errors at the detection unit above a predetermined number of detection errors:

- to feed the second useful signal component estimates provided for the plurality of signal components to the regeneration unit;
- to cause the first estimation unit to provide a first useful signal estimate associated with the modulated signal based on the modulated signal and on said regenerated useful signal, and
- to cause the second estimation unit to provide a second useful signal estimate indicative of the useful signal of that modulated signal.

According to an embodiment of the present invention, additional or alternative to any of the previous embodiments, the first estimation unit comprises a demodulation unit for providing, e.g. from the modulated signal, an interfering signal estimate preferably indicative of the interfering signal of the modulated signal. The first estimation unit is preferably configured to provide said first useful signal estimate based on said interfering signal estimate and, preferably, on said modulated signal. The control unit is advantageously configured to cause the demodulation unit to provide the interfering signal estimate based on said transmission information.

According to an embodiment of the present invention, additional or alternative to any of the previous embodiments, the control unit is iteratively configured:

- to feed the second useful signal component estimates provided for the plurality of signal components to the regeneration unit;

to cause the first estimation unit to provide a useful signal estimate associated with the modulated signal based on the modulated signal and on said regenerated useful signal, and to cause the second estimation unit to provide a useful signal estimate indicative of the useful signal of that modulated signal, preferably for a predetermined number of iterations or until the number of detection errors at the detection unit is below the predetermined number of detection errors.

According to an embodiment of the present invention, additional or alternative to any of the previous embodiments, the first estimation unit is configured to provide, preferably for each signal component, an interfering signal component estimate preferably indicative of the interfering signal component of that signal component. The first estimation unit is preferably configured to provide the respective first useful signal component estimate based on said interfering signal component estimate and, preferably, on said signal component.

Another aspect of the present invention relates to a method for receiving a modulated signal including useful and interfering signals and for detecting information bits carried thereon. The modulated signal may comprise a plurality of signal components each one associated with a respective modulation subcarrier and including respective useful and interfering signal components. The method may comprise:

providing, for each signal component, a respective first useful signal component estimate indicative of the useful signal component of that signal component (i.e., the first useful signal component estimate providing a first indication of the useful signal component of that signal component);

providing, for each signal component, a respective second useful signal component estimate indicative of the useful signal component of that signal component (i.e., the second useful signal component estimate providing a second indication of the useful signal component of that signal component, the second indication being different from the first indication);

estimating, for each signal component, a first channel frequency response associated with the respective useful signal component and a second channel frequency response associated with the respective interfering signal component;

determining, for each signal component, an interference level experienced by that signal component according to the respective first and second channel frequency responses, and, for each signal component, alternatively:

providing the respective second useful signal component estimate from that signal component if the interference level experienced by that signal component is lower than a threshold interference level, or providing the respective second useful signal component estimate from the respective first useful signal component estimate if the interference level experienced by that signal component is higher than the threshold interference level, and detecting the information bits carried on the modulated signal according to the second useful signal component bit estimates provided for the plurality of signal components.

BRIEF DESCRIPTION OF THE ANNEXED DRAWINGS

Figure 2A:
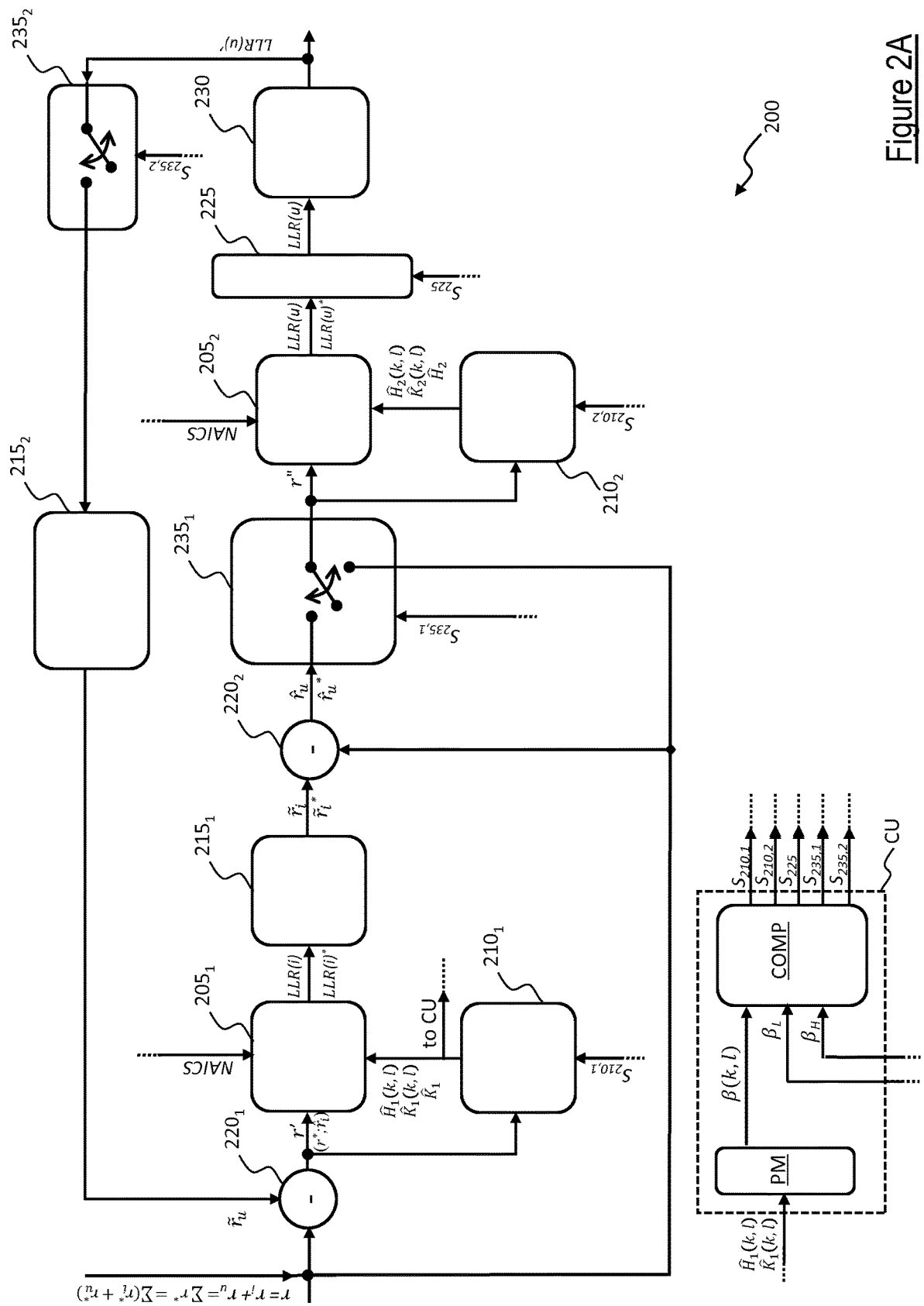
Figure 2B:
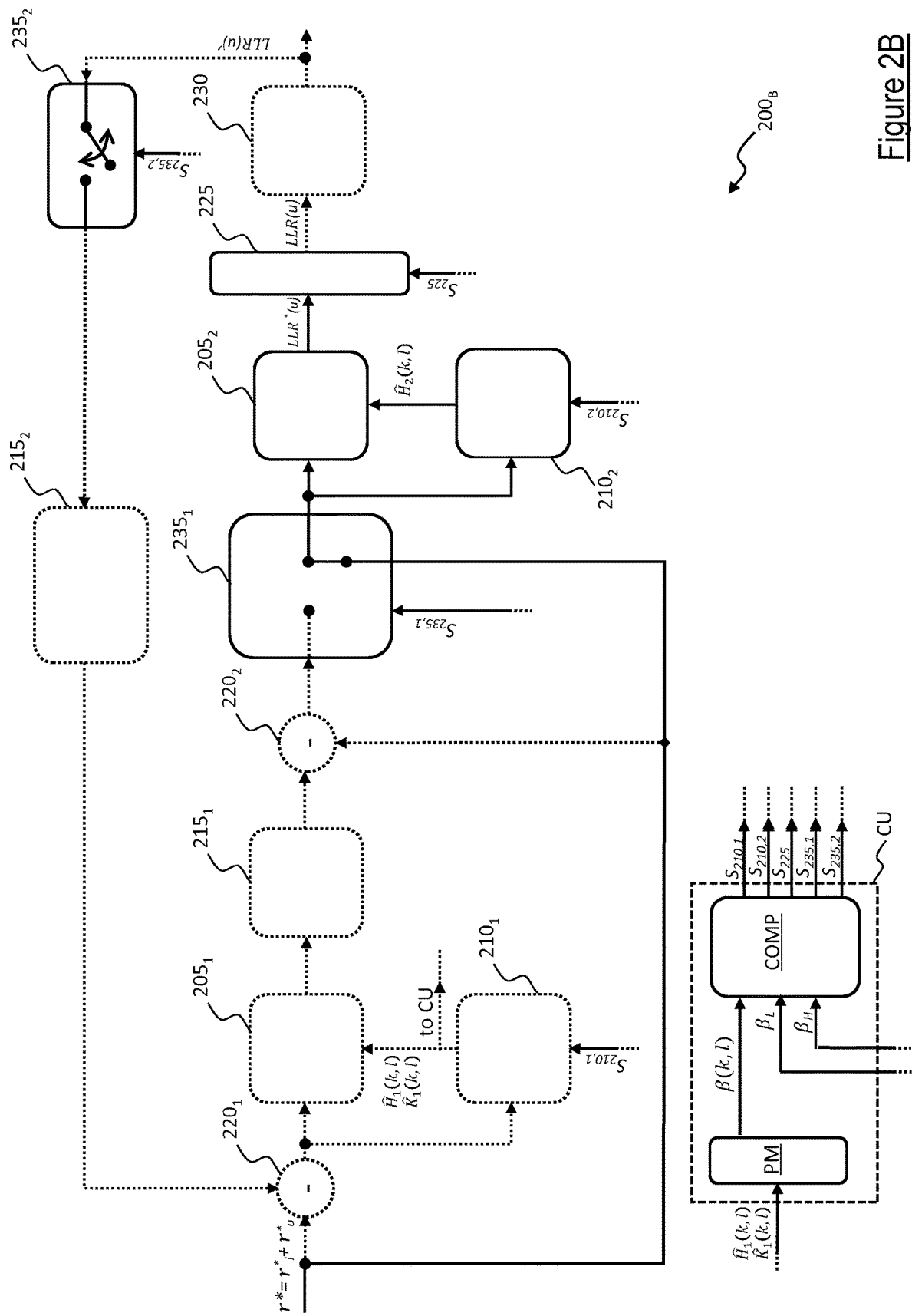
Figure 2C:
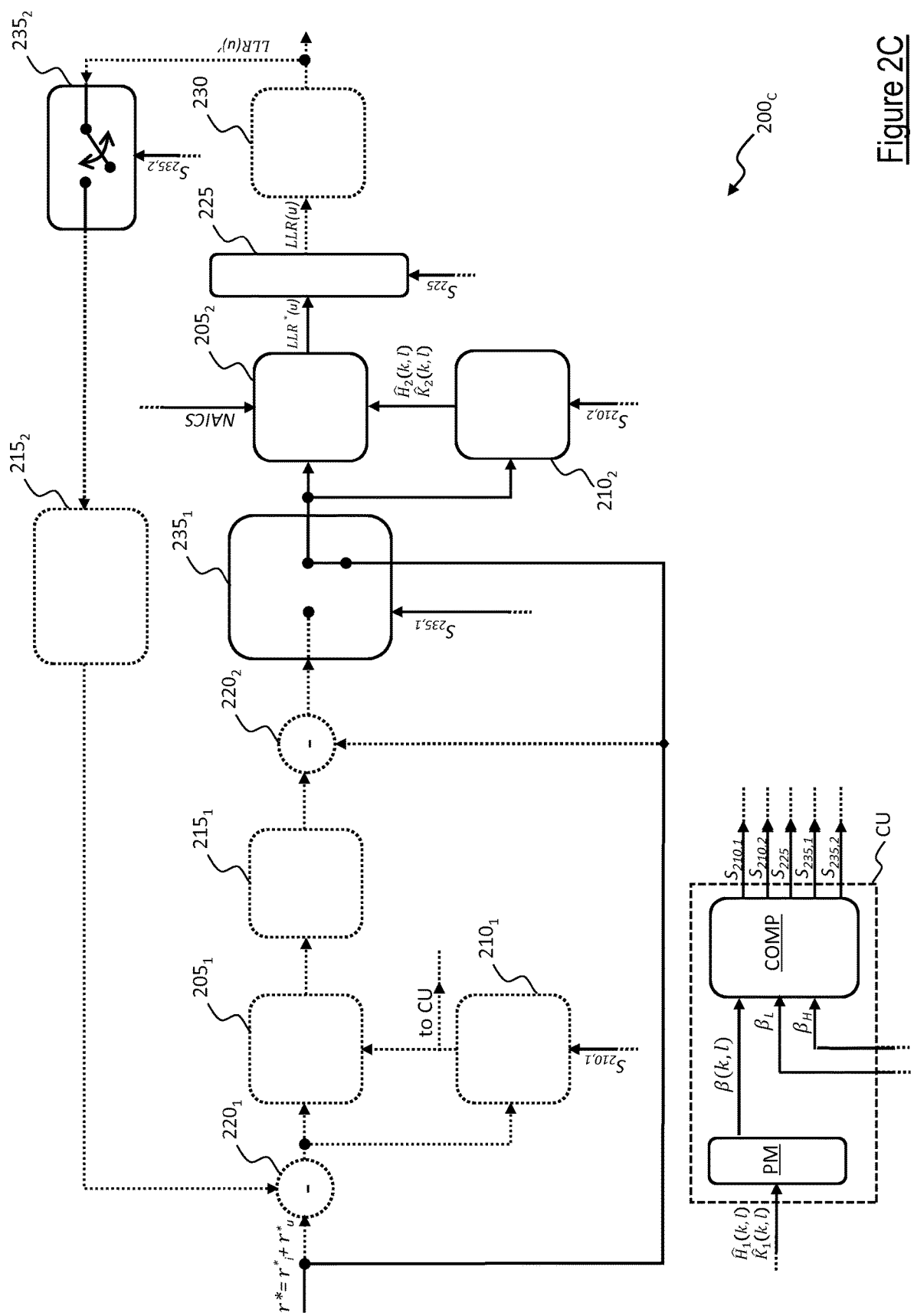
Figure 2D:
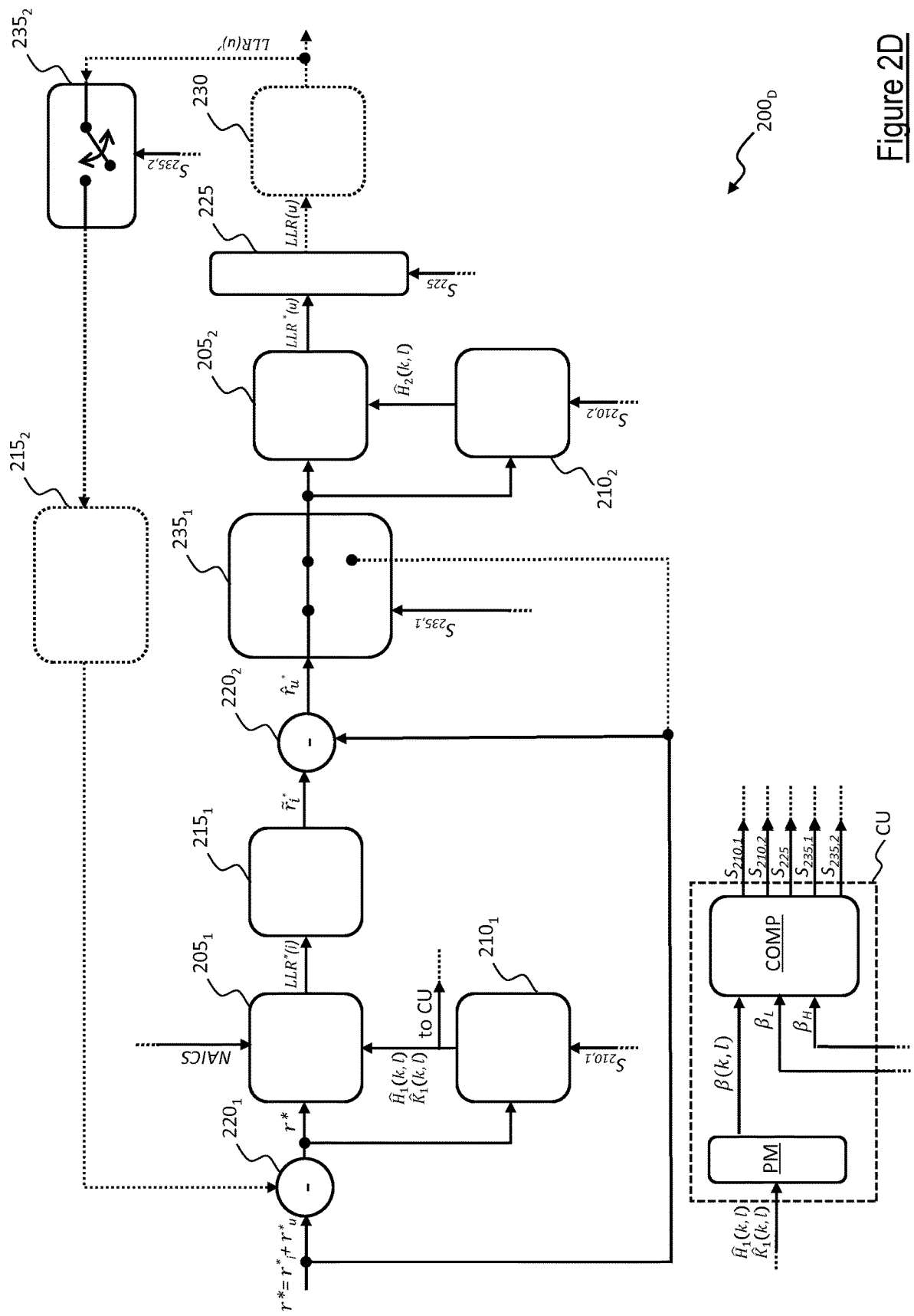
Figure 2E:
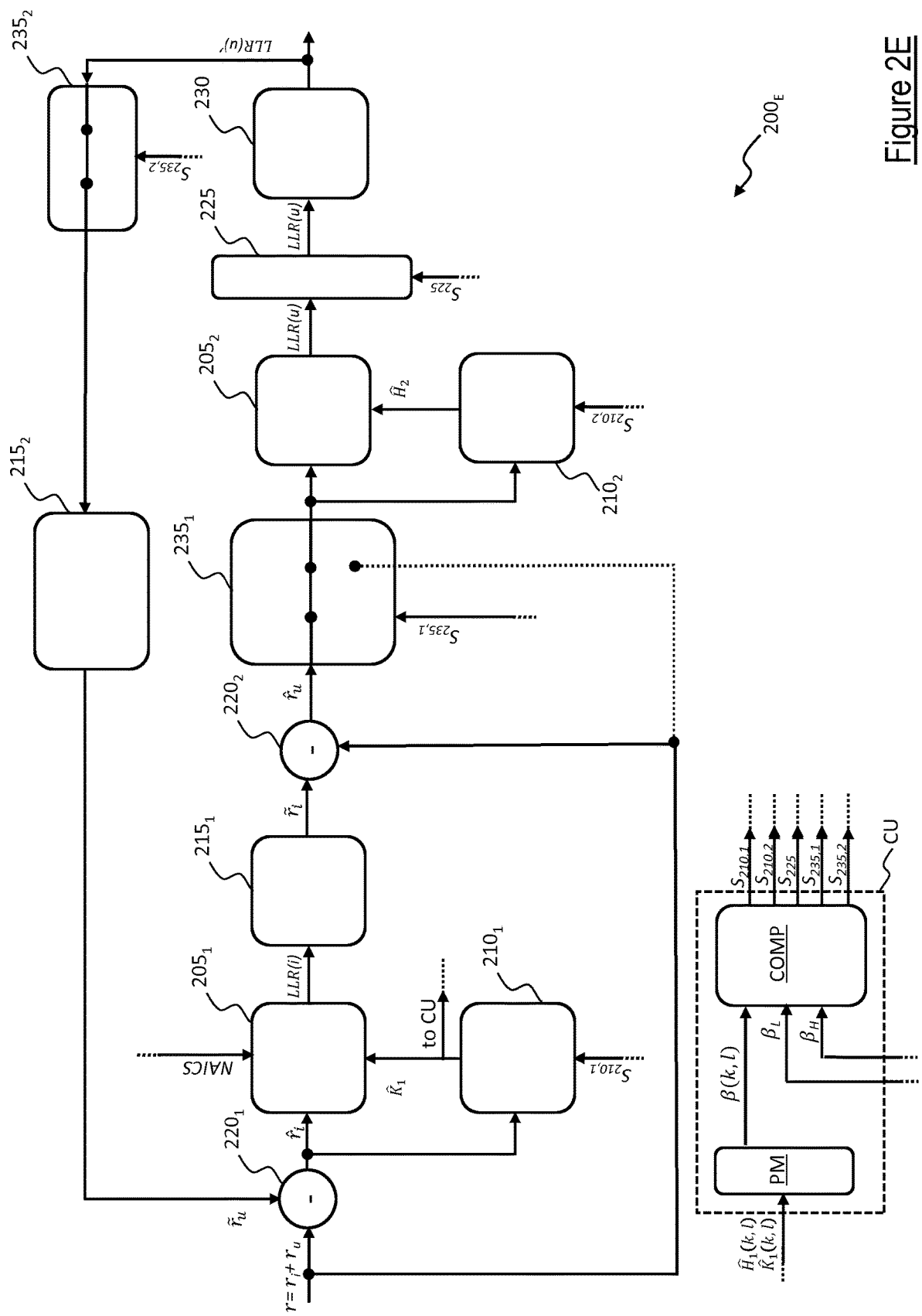
Figure 3:
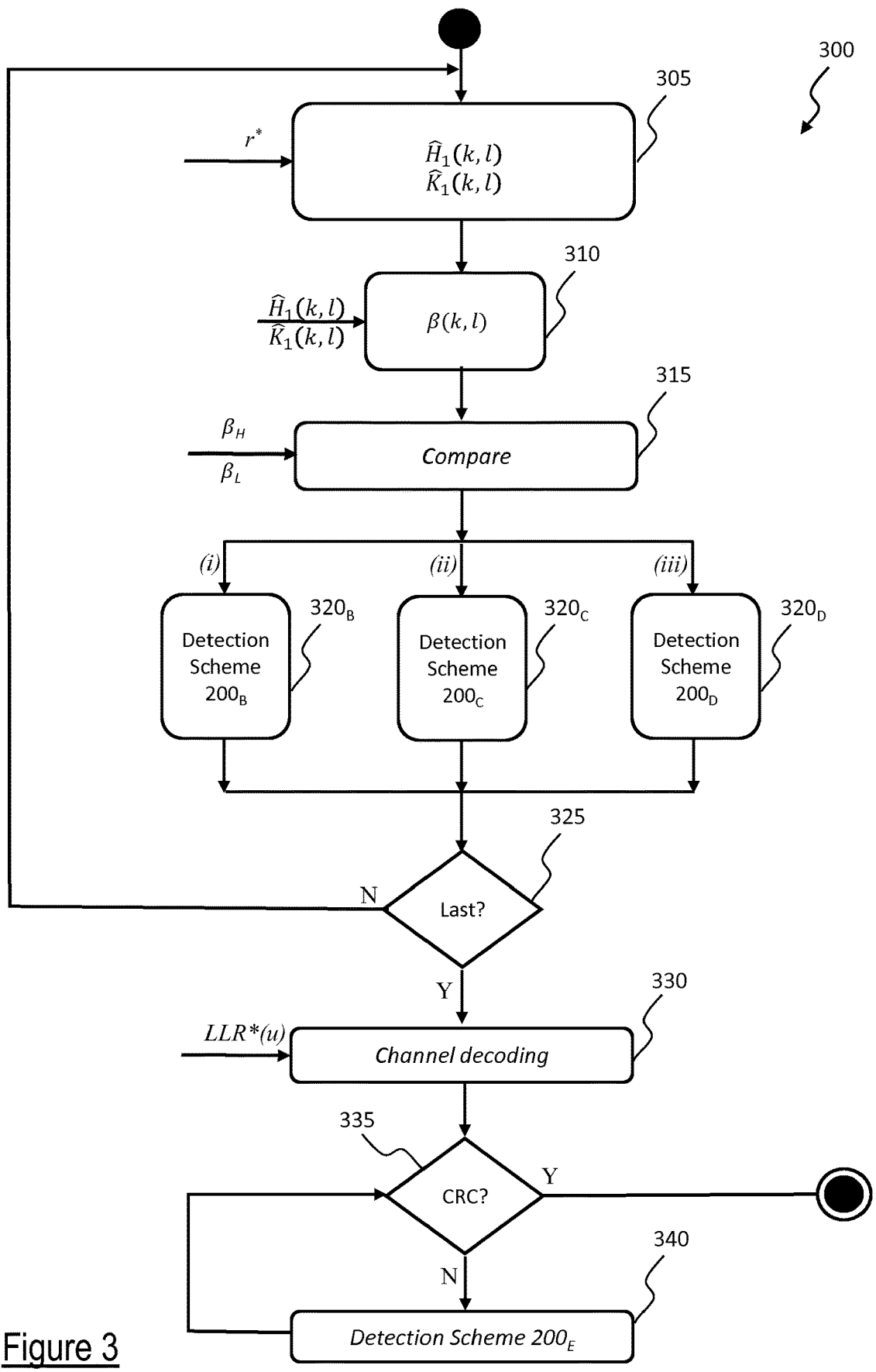

These and other features and advantages of the present invention will be made apparent by the following description of some exemplary and non-limitative embodiments thereof. For its better intelligibility, the following description should be read making reference to the attached drawings, wherein:

FIG. 1 schematically shows a wireless communication network wherein the present invention may be applied;

FIG. 2A schematically shows a receiver adapted to be used in said wireless communication network, according to an embodiment of the present invention;

FIG. 2B-2E schematically show respective detection schemes of the receiver of FIG. 2A according to embodiments of the present invention, and FIG. 3 schematically shows an activity diagram of a detection process carried out by the receiver of FIG. 2A according an embodiment of the present invention.

DETAILED DESCRIPTION OF PREFERRED EMBODIMENTS OF THE INVENTION

With reference to the drawings, a wireless communication network 100 wherein the present invention may be applied is schematically illustrated in FIG. 1. The wireless communication network 100 comprises one (as illustrated) or more transceiver stations (hereinafter, network nodes), such as the network node 105.

Each network node, such as the network node 105, is configured to provide radio coverage over a respective geographic area, also referred to as network cell, such as the network cell $105_C$, for allowing user equipment (e.g., mobile phones) within a respective network cell (such as the illustrated user equipment 110 within the network cell $105_C$) to exchange Radio Frequency (RF) signals enabling data traffic services (e.g., web browsing, e-mailing, voice, and/or multimedia services).

Both the network node 105 and the user equipment 110 within the network cell $105_C$ advantageously comprise respective transmitting/receiving antennas (not shown) for mutual exchange of the RF signals, and suitable processing circuitry (not shown) for properly processing them.

For the purposes of the present disclosure, processing circuitry comprises a receiver for converting the received RF signals into corresponding base-band signals and processing them for information bits detection (i.e. for extraction of the information bits carried thereon), and a transmitter for processing and base-band/RF converting signals to be transmitted via the respective transmitting antenna/antennas.

The wireless communication network 100 is for example compliant with the 3GPP LTE/LTE-Advanced standard. However, the principles of the present invention generally apply to any wireless communication network based on multicarrier transmission techniques (such as "Orthogonal Frequency Division Multiplexing" (OFDM) technique) and on "Multiple Input Multiple Output" (MIMO) technique, such as for example the 5G NR (New Radio) recently specified by 3GPP.

According to OFDM technique, bits to be transmitted (including both the information bits and control bits, such as redundancy bits) are split into bits sequences, thereafter the bits sequences are modulated by separate and reciprocally orthogonal subcarriers and multiplexed into OFDM symbols for transmission.

OFDM technique is based on radio resources allocation in time/frequency domain. Considering for example the 3GPP LTE/LTE-Advanced standard, in time domain radio resources are distributed every "Transmission Time Interval" (TTI), each one lasting 1 ms (sub-frame) and comprising two time slots of 0.5 ms, whereas in frequency domain the whole bandwidth is divided into a plurality of 180-kHz sub-channels. A radio resource comprising a number of OFDM symbols (e.g., seven) spanning over one time slot in time domain and twelve adjacent subcarriers in frequency domain is referred to as "Physical Resource Block" (PRB) and corresponds to the smallest radio resource that can be allocated to a user equipment 110 for data transmission or reception.

According to MIMO technique, the OFDM symbols are transmitted/received via multiple transmitting/receiving antennas at both network node 105 and user equipment 110 sides, which improves communication performance without additional bandwidth or increased transmission power. OFDM symbols transmission over multiple transmitting antennas can be achieved, for example, by means of SFBC ("Space Frequency Block Coding") or STBC ("Space Time Block Coding") transmission techniques (e.g., in case of two transmitting antennas), by means of SFBC-FSTD ("SFBC-Frequency Switching Transmit Diversity") transmission technique (e.g., in case of four transmitting antennas), by means of "Spatial Multiplexing" transmission technique, by means of "Precoding" transmission technique, or by means of any combination of these and/or other transmission techniques.

With reference now to FIG. 2A, it schematically shows, according to an embodiment of the present invention, a receiver 200 adapted to be used in the wireless communication network 100. For the sake of conciseness, only a part of the receiver 200 relevant for understanding the present invention (i.e., the base-band part) has been illustrated and will be discussed here below, with the other, well known parts of the receiver 200 (e.g., antennas, RF filters, duplexers, RF/IF front-end, mixers for frequency down-conversion, A/D converters) that have been intentionally omitted or simplified.

The receiver 200 is applicable both at the user equipment 110 side (i.e., in the downlink) and at the network node 105 side (i.e., in the uplink). In any case, as will be better understood from the following discussion, the advantages of the present invention are particularly apparent when the receiver 200 is applied at an entity, such as the user equipment 110, which is more likely affected by computational constraints.

Basically, the receiver 200 is configured to receive a modulated signal r including both useful $r_u$ and interfering $r_i$ signals, and for detecting (i.e., extracting) the information (e.g., the information bits) carried thereon. In the example at issue in which only the base-band part of the receiver 200 is considered, the modulated signal r is essentially the composite baseband signal containing the OFDM symbols (i.e. the QPSK/QAM modulated symbols) in the frequency domain (i.e. after the application of the FFT operation).

The useful signals $r_u$ may for example comprise the signals received at the user equipment 110 from the (serving) network node 105 (downlink) or the signals received at the network node 105 from the (served) user equipment 110 (uplink).

The interfering signals $r_i$ may for example comprise one or more among:
  intra-cell interfering signals (in case of MU ("Multi User")-MIMO transmission), i.e. the signals to/from the same (serving) network node 105 from/to a different user equipment 110 allocated on same radio resources (and, hence, acting as intra-cell interfering user equipment);
  inter-cell interfering signals, i.e. the signals received at the user equipment 110 from network nodes adjacent the (serving) network node 105 (and, hence, acting as interfering network nodes), or the signals received at the network node 105 from user equipment served by adjacent network nodes (and, hence, acting as inter-cell interfering user equipment).

For the purposes of the present description, the modulated signal r comprises a plurality of signal components r* each one associated with a respective (OFDM) modulation subcarrier and including respective useful $r_u$* and interfering $r_i$* signal components; in other words, as represented in FIG. 2A, the modulated signal r may be expressed as follows:

$$r = r_i + r_u = \Sigma r^* = \Sigma(r_i^* + r_u^*)$$

For the purposes of the present description, the modulated signal r is assumed to be already processed by a FFT (Fast Fourier Transform) algorithm (the FFT module being not shown in the figures), so that the modulated signal r is assumed to be already divided into frequency components thereof (i.e., into single sinusoidal oscillations at distinct frequencies each one with respective amplitude and phase); in other words, the modulated signal r is assumed to be already divided into its signal components r*, whereby the units of the receiver 200 discussed in the following are assumed to be able to perform the respective processing operations both at subcarrier level (i.e., at the level of each signal component r*) and at the level of the modulated signal r (i.e., by performing the respective processing operations on the signal components r* concurrently). As better discussed in the following, the receiver 200 is advantageously configured to perform the processing operations at subcarrier level or at the level of the modulated signal r according to a detection scheme among a plurality of detection schemes that can selectively be taken by the receiver 200.

In the following, for the sake of ease, the wireless communication network 100 is assumed to be a synchronous wireless communication network (i.e. wherein all network nodes thereof are frame synchronized), and the receiver 200 is assumed to be aware of transmission information required for demodulating the interfering signal $r_i$/each interfering signal component $r_i$* (or at least a dominant component thereof) at symbol level (i.e., up to the generation of an estimate of the transmitted QPSK/QAM modulated symbols). In other words, the receiver 200 is advantageously assumed to support "Network Assisted Interference Cancellation and Suppression" (NAICS) signalling for receiving the transmission information associated with the modulated signal r (and, hence, with the signal components r* thereof)—as opposed to common blind detection techniques providing for transmission information estimates, which inherently feature low accuracy.

For demodulating the interfering signal $r_i$/each interfering signal component $r_i$* (or at least the dominant component thereof), the transmission information may comprise one or more of the following:
  allocated radio resources (i.e., sub-frames, PRB);
  "Modulation and Coding Scheme" (MCS);
  scrambling sequence;
  transmission technique (i.e., Transmission Mode);
  precoding vector or matrix used at the transmitter (when precoding transmission technique, as herein assumed, or when any other transmission technique including precoding is used);
  "Reference Signals" (RS) of the interfering network node or of the interfering user equipment (i.e., RS position, RS sequence, number of antenna ports, power boost level).

For the sake of completeness, when the receiver 200 is applied at the network node 105 side, the transmission information (or at least a subset thereof) may be known at the network node 105: just as an example, for inter-cell interfering user equipment the transmission information may be acquired by the network node 105 through signalling exchange with the adjacent network node (e.g. based on X2 interface or other interfaces); just as another example, in case of centralized baseband architectures (e.g., Cloud RAN), the transmission information is already available at the central unit side (as it includes the baseband of both serving and interfering network cells).

In the following, for ease of description, the interfering signal $r_i$ (or at least the dominant component thereof) is assumed to be allocated on the same PRBs as the useful signal $r_u$. This represents a particular case, in that typically PRB allocation for the useful and interfering signals is only partially superimposed (i.e., only a subset of the allocated PRBs is actually the same for the useful $r_u$ and interfering $r_i$ signals). In any case, the principles of the present invention discussed in the following equivalently apply, mutatis mutandis, to multiple interfering signals whose dominant interfering components are different on a considered PRB. The possibility for the receiver 200 to treat multiple interfering signals may for example depend on processing capabilities thereof and/or on the possibility to estimate the characteristics of a larger number of interfering signals (which in turn has an impact on the signalling load and has to be traded-off with performance improvement in terms of user throughput).

As mentioned above, the receiver 200 is configured to detect (i.e., to extract or determine) the information bits based on one or more detection schemes among a plurality of detection schemes that can selectively be taken by the receiver 200—the detection schemes that can be selectively taken by the receiver 200 being illustrated in FIGS. 2B-2E and being respectively denoted by $200_B$-$200_E$ (wherein, in each figure, the units of the receiver 200 that are selectively inactive or disabled in the corresponding detection scheme $200_B$-$200_E$ are represented by dotted lines).

As visible in the figure, the receiver 200 preferably comprises a demodulation unit (e.g., a MIMO demodulation unit) $205_1$ for receiving a signal r' depending on the modulated signal r, and for providing an estimate (preferably, a LLR ("Log Likelihood Ratio")-based estimate) of the transmitted bits (i.e. of the bits that have been transmitted by a transmitter, not shown, after encoding), or soft encoded bits, associated with the interfering signal $r_i$ or, depending on the detection scheme, with the interfering signal component n* (hereinafter referred to as soft encoded bits LLR(i) or soft encoded bits LLR(i)*, respectively). In the present disclosure, the soft encoded bits LLR(i) and the soft encoded bits LLR(i)* are also referred to as, respectively, signal (or interfering signal) estimate (which is indicative of the interfering signal $r_i$) and signal (or interfering signal) component estimate (which is indicative of the interfering signal component $r_i$*).

As better discussed in the following (and as conceptually indicated in FIG. 2A by notation (r*; $\hat{r}_i$)), according to the selected decoding scheme taken by the receiver 200, the signal r' may be the signal component r*, or an estimate of the interfering signal $r_i$ of the modulated signal r (hereinafter, interfering signal estimate $\hat{r}_i$)—as better discussed in the following, the interfering signal estimate $\hat{r}_i$ is preferably obtained by subtracting a regenerated version of the useful signal (hereinafter, regenerated useful signal $f_u$) from the modulated signal r.

In case of Spatial Multiplexing transmission (e.g., TM3, TM4 in case of LTE/LTE-A technology), the demodulation unit $205_1$ may be implemented based on a QRD-M algorithm making use of QR Decomposition and M-algorithm for separating multiple transmitted data streams. An exemplary implementation of the QRD-M algorithm can be found in Kenichi Higuchi et al., "*Adaptive Selection of Surviving Symbol Replica Candidates Based on Maximum Reliability in QRM-MLD for OFCDM MIMO Multiplexing*", NTT DoCoMo, IEEE 2004, which is herein incorporated by reference. However, any other Spatial Demultiplexing algorithm outputting soft estimates of the transmitted encoded bits may be employed in the demodulation unit $205_1$. For example, the combination of a "Minimum Mean Square Error" (MMSE) algorithm (not shown) followed by a symbol-to-bit demapping algorithm (also not shown) may be used in place of the QRD-M algorithm. Similarly, different ML-like detection algorithms, such as for example a sphere decoding algorithm, may be used in the demodulation unit $205_1$.

In case of Transmit Diversity transmission (e.g., TM2 in case of LTE technology), the demodulation unit $205_1$ may for example be implemented based on Alamouti decoding algorithm followed by a symbol-to-bit demapping algorithm. A description of the Alamouti decoding algorithm for the decoding of Space/Frequency or Space/Time Block Codes (SFBC or STBC) is provided in S. M. Alamouti, "*A Simple Transmit Diversity Technique for Wireless Communications*", IEEE Journal on Select Areas in Communications, vol. 16, no. 8, October 1998, which is herein incorporated by reference, and an exemplary implementation of the symbol-to-bit demapping algorithm can be found in F. Tosato et al., "*Simplified Soft-Output Demapper for Binary Interleaved COFDM with Application to HIPERLAN/2*", which is also incorporated herein by reference.

As visible in the figure, the demodulation unit $205_1$ is adapted to selectively exchange the NAICS signalling with the network node 105, in order to improve the demodulation operation—as will be better discussed in the following, exchange of NAICS signalling between the demodulation unit $205_1$ and the network node 105 is advantageously enabled when the receiver 200 takes the detection scheme $200_D$ or the detection scheme $200_E$. In any case the NAICS signalling at the demodulation unit $205_1$ may also be omitted in a basic implementation, the NAICS signalling at the demodulation unit $205_1$ being for example complementary to, or replaced by, other interference suppression or cancellation techniques (for example, interference suppression or cancellation techniques where one or more parameters of the interfering signals are estimated, e.g. by blind detection, at the receiver side).

As visible in the figure, the receiver 200 preferably comprises a channel estimation unit $210_1$ configured to receive, at a preliminary phase of a detection process aimed at determining and selecting the detection scheme to be taken by the receiver 200, the modulated signal r and to determine, for each signal component r (or, equivalently, for each OFDM subcarrier/OFDM symbol), a channel frequency response estimate associated with the respective useful signal component $r_u$* (hereinafter referred to as channel frequency response estimate $\hat{H}_1(k,l)$) and a channel frequency response estimate associated with the respective interfering signal component $r_i$* (hereinafter referred to as channel frequency response estimate $\hat{K}_1(k,l)$)—the dependency on k and l being intended to emphasize that each channel frequency response estimate is determined for the k-th OFDM subcarrier/l-th OFDM symbol. As better discussed in the following, the channel frequency response estimates $\hat{H}_1(k,l)$), $\hat{K}_1(k,l)$ are also taken into consideration when, after the preliminary phase of the detection process, the receiver 200 takes the detection scheme $200_D$.

Preferably, the channel estimation unit $210_1$ is also configured to receive, after the preliminary phase of the detection process (and, preferably, when the receiver 200 takes the detection scheme $200_E$, as better discussed in the following), the interfering signal estimate $\hat{r}_i$, and to provide the channel frequency response estimate associated therewith—the channel frequency response estimate associated with the interfering signal estimate $\hat{r}_i$ being denoted by (i.e., without the dependency on any specific l-th OFDM subcarrier/l-th OFDM symbol), in that, as better discussed in the following, when the receiver 200 takes the detection scheme $200_E$ all the l-th OFDM subcarriers/l-th OFDM symbols are considered concurrently.

Reception at the channel estimation unit $210_1$ of the modulated signal r or of the interfering signal component $\hat{r}_i$ is conceptually represented in FIG. 2A by reception of the signal r' (indeed, as will be apparent from the following discussion, r'=r during the preliminary phase of the detection process and when the receiver 200 takes the detection scheme $200_D$, and r'=$\hat{r}_i$ when the receiver 200 takes the detection scheme $200_E$). Preferably, as illustrated, the determination (by the channel estimation unit $210_1$) of only the channel frequency response estimate $\hat{K}_1(k,l)$ or only the channel frequency response estimate (i.e., r'=$\hat{r}_i$), or of both the channel frequency response estimates $\hat{H}_1(k,l)$, $\hat{K}_1(k,l)$ (i.e., r'=r*) is enabled by respective values of a control signal $S_{210,1}$ received at the channel estimation unit $210_1$ (e.g., from a control unit CU of the receiver 200, as better discussed below).

According to the exemplary considered embodiment, the channel estimation unit $210_1$ is configured to determine the channel frequency response estimate $\hat{K}_1$ and the channel frequency response estimates $\hat{H}_1(k,l)$, $\hat{K}_1(k,l)$ based on pilot signals transmitted together with the modulated signal r. In the example at issue of a wireless communication network based on the LTE/LTE-Advanced standard, the pilot signals may comprise the Common Reference Signals (CRS) in downlink transmission (i.e., in the transmission from the network node 105 to the user equipment 110) and/or the Demodulation Reference Signals (DM-RS) in uplink transmission (i.e., in the transmission from the user equipment 110 to the network node 105).

The channel estimation unit $210_1$ is advantageously configured to provide the channel frequency response estimate $\hat{K}_1$ or the channel frequency response estimates $\hat{H}_1(k,l)$, $\hat{K}_1(k,l)$ (depending on the selected decoding scheme taken by the receiver 200) to the demodulation unit $205_1$, whereby the demodulation unit $205_1$ is advantageously configured to determine the soft encoded bits LLR(i) or the soft encoded bits LLR(i) according to the channel frequency response estimate $\hat{K}_1$ or to the channel frequency response estimates $\hat{H}_1(k,l)$, $\hat{K}_1(k,l)$, respectively. Moreover, the channel estimation unit $210_1$ is advantageously configured to provide the channel frequency response estimates $\hat{H}_1(k,l)$, $\hat{K}_1(k,l)$ to the control unit CU of the receiver 200 (preferably, to a processing module thereof, as discussed here below).

As mentioned above, the control unit CU (advantageously, a processing module PM thereof) is preferably configured to receive (e.g., during the preliminary phase of the detection process) the channel frequency response estimates $\hat{H}_1(k,l)$, $\hat{K}_1(k,l)$ from the channel estimation unit $210_1$ and to determine a level of interference experienced by the corresponding signal component r* (as better discussed in the following, the level of interference experienced by each signal component r*, or equivalently by each k-th OFDM subcarrier/l-th OFDM symbol, is preferably used to select the detection scheme, among the detection schemes $200_B$-$200_D$ to be taken by the receiver 200).

More preferably, the level of interference experienced by each signal component r* determined by control unit CU (particularly, in the example at issue, by the processing module PM thereof) comprises an interference metric $\beta(k,l)$.

An exemplary interference metric $\beta(k,l)$ may be calculated as follows:

$$\beta(k, l) = \frac{P_U(k, l)}{P_I(k, l)} = \frac{\|\hat{H}_1(k, l)\|^2}{\|\hat{K}_1(k, l)\|^2}$$

where $P_U(k,l)$ is the power of the useful signal component $r_u^*$ and $P_I(k,l)$ is the power of the interfering signal component $r_i^*$.

However, other interference metrics may be used; just as an example, interference metrics based on "Signal to Interference plus Noise Ratio" (SINR) measurements may be used.

As visible in the figure, the receiver 200 preferably comprises a regeneration unit $215_1$ for receiving the soft encoded bits LLR(i), or the soft encoded bits LLR(i)*, and for providing a regenerated version thereof. As mentioned above, based on the selected detection scheme, the soft encoded bits LLR(i) may be associated with the interfering signal $r_i$ or with the interfering signal estimate $\hat{r}_i$, whereas the soft encoded bits LLR(i)* are associated with the interfering signal component $r_i^*$; therefore, the regenerated soft encoded bits LLR(i) and the regenerated soft encoded bits LLR(i)* will be broadly referred to as regenerated interfering signal $\tilde{r}_i$ and regenerated interfering signal component $\tilde{r}_i^*$, respectively.

Preferably, as herein exemplary assumed, the regeneration of the soft encoded bits LLR(i) into the regenerated interfering signal $\tilde{r}_i$ or the regeneration of the soft encoded bits LLR(i)* into the regenerated interfering signal component $\tilde{r}_i^*$ comprises a regeneration at symbol level: a detailed description of a symbol level regeneration may for example be found in G. Berardinelli et al. "*Improving SC-FDMA Performance by Turbo Equalization in UTRA LTE Uplink*", IEEE 2008, pp. 2557-2561, which is herein incorporated by reference.

As visible in the figure, the receiver 200 preferably comprises a subtraction unit $220_1$ configured to subtract the regenerated useful signal component $\tilde{r}_u$ from the modulated signal r (when the selected detection scheme of the receiver 200 provides for it, such as when the detection scheme $200_E$ is selected)—i.e. r'=r-$\tilde{r}_u$. As will be understood from the following description, when the subtraction unit $220_1$ is active and no regenerated useful signal estimate $r_u$ is received at it (such as when the detection scheme $200_D$ is selected), no subtraction takes place at the subtraction unit $220_1$ and the modulated signal r (particularly, each signal component r thereof) is passed substantially unaltered to the demodulation unit $205_1$ (i.e., r'=r*).

Additionally, as herein exemplary considered, or alternatively, the receiver 200 comprises a further subtraction unit $220_2$. The subtraction unit $220_2$ is preferably configured to subtract the regenerated interfering signal $\tilde{r}_i$ from the input signal r (e.g., when the detection scheme $200_E$ is selected) or the regenerated interfering signal component $\tilde{r}_i^*$ from the signal component r* (e.g., when the detection scheme $200_D$ is selected), thereby obtaining respectively an estimate of the useful signal $r_u$ (hereinafter, useful signal estimate $\hat{r}_u$), which is indicative of the useful signal $r_u$, or an estimate of the useful signal component $r_u^*$ (hereinafter, useful signal component estimate $\hat{r}_u^*$), which is indicative of the useful signal component $r_u^*$.

In other words, the demodulation unit $205_1$, the regeneration unit $215_1$ and the subtraction units $220_1, 220_2$ act, as a whole, as an estimation unit adapted to provide, for each signal component r*, the respective useful signal component estimate $\hat{r}_u^*$ or, for the modulated signal r, the respective useful signal estimate $\hat{r}_u$. As should be understood, such an estimation unit may be broadly configured to provide the respective useful signal component estimate $\hat{r}_u^*$ and/or the respective useful signal estimate $\hat{r}_u$ based on the signal component r and the soft encoded bits LLR(i)* and/or on the modulated signal r and the soft encoded bits LLR(i), respectively, in any other way (e.g., by processing the signal component r and the soft encoded bits LLR(i)* and/or the modulated signal r and the soft encoded bits LLR(i) through any other suitable operation other than subtraction, in which case at least the subtraction unit $220_2$ may be omitted).

As visible in the figure, the receiver 200 preferably comprises a further demodulation unit $205_2$ (preferably, a further MIMO demodulation unit). Preferably, although not necessarily, the demodulation unit $205_2$ is analogous to the demodulation unit $205_1$, the demodulation units $205_1, 205_2$ being for example physically separate units (as herein illustrated) or logically separate units formed in a single physical unit and individually selectable to be operated.

The demodulation unit $205_2$ is preferably configured to receive a signal r'', and for providing an estimate (preferably, a LLR ("Log Likelihood Ratio")-based estimate) of the transmitted encoded bits (or soft encoded bits) associated, depending on the detection scheme, with the useful signal estimate $\hat{r}_u$ (hereinafter referred to as soft encoded bits LLR(u) or signal (or useful signal) estimate LLR(u)), or with the useful signal component $r_u^*$, or with the useful signal component estimate $\hat{r}_u^*$ (hereinafter referred to as soft encoded bits LLR(u)* or signal (or useful signal) component estimate LLR(u)*). In fact, as better discussed in the following, according to the selected decoding scheme taken by the receiver 200, the signal r'' may be the useful signal component estimate $\hat{r}_u$ (e.g., detection scheme $200_E$), the signal component r (e.g., detection schemes $200_B$ and $200_C$), or the useful signal component $r_u^*$ (e.g., detection scheme $200_D$)—with the reception of the useful signal component estimate $\hat{r}_u$, of the signal component r*, of the useful signal component $r_u^*$ or of none of them that, as will be better discussed below, is advantageously performed by properly controlling a switching unit placed between the subtraction unit $220_2$ and the demodulation unit $205_2$.

In other words, the demodulation unit $205_2$ acts as an estimation unit configured to provide, for each signal component r*, the soft encoded bits LLR(u)* associated with the useful signal component $r_u^*$ of that signal component r*, or, for the modulated signal r, the soft encoded bits LLR(u) associated with the useful signal $r_u$ of the modulated signal r (preferably, as in the exemplary considered embodiment, the soft encoded bits LLR(u) are associated with useful signal component estimate $\hat{r}_u$ of the modulated signal r).

Similarly to the demodulation unit $205_1$, in case of Spatial Multiplexing transmission (e.g., TM3, TM4 in case of LTE/LTE-A technology), the demodulation unit $205_2$ may be implemented based on a QRD-M algorithm making use of QR Decomposition and M-algorithm for separating multiple transmitted data streams. An exemplary implementation of the QRD-M algorithm can be found in Kenichi Higuchi et al, "*Adaptive Selection of Surviving Symbol Replica Candidates Based on Maximum Reliability in QRM-MLD for OFCDM MIMO Multiplexing*", NTT DoCoMo, IEEE 2004, which is herein incorporated by reference. However, any other Spatial Demultiplexing algorithm outputting soft estimates of the transmitted encoded bits may be employed in the demodulation unit $205_2$. For example, the combination of a "Minimum Mean Square Error" (MMSE) algorithm (not shown) followed by a symbol-to-bit demapping algorithm (also not shown) may be used in place of the QRD-M algorithm. Similarly, different ML-like detection algorithms, such as for example a sphere decoding algorithm, may be used in the demodulation unit $205_2$.

In case of Transmit Diversity transmission (e.g., TM2 in case of LTE technology), the demodulation unit $205_2$ may for example be implemented based on Alamouti decoding algorithm followed by a symbol-to-bit demapping algorithm.

As visible in the figure, the demodulation unit $205_2$ is adapted to selectively exchange the NAICS signalling with the network node 105, in order to improve the demodulation operation—as will be better discussed in the following, exchange of NAICS signalling between the demodulation unit $205_2$ and the network node 105 is advantageously enabled when the receiver 200 takes the detection scheme $200_C$.

As visible in the figure, the receiver 200 preferably comprises a further channel estimation unit $210_2$. Preferably, although not necessarily, the channel estimation unit $210_2$ is analogous to the channel estimation unit $210_1$, the channel estimation units $210_1, 210_2$ being for example physically separate units (as herein illustrated) or logically separate units formed in a single physical unit and individually selectable to be operated.

The channel estimation unit $210_2$ is preferably configured to receive the signal r'' and to determine respective channel frequency response estimates $\hat{H}_2(k,l)$, $\hat{K}_2(k,l)$, $\hat{H}_2(k,l)$ or $\hat{H}_2$.

As will be readily understood from the following description, the channel frequency response estimate $\hat{H}_2(k,l)$ is the channel frequency response estimate associated with the useful signal component $r_u^*$ (i.e. r''=r*, such as when the receiver 200 takes detection schemes $200_B$-$200_C$) or with the useful signal component estimate $\hat{r}_u^*$ (i.e. r''=$\hat{r}_u^*$, such as when the receiver 200 takes detection scheme $200_D$), whereas the channel frequency response estimate $\hat{K}_2(k,l)$ is the channel frequency response estimate associated with the interfering signal component $r_i^*$ (i.e. r''=r*, such as when the receiver 200 takes the detection scheme $200_C$)—similarly to the above, the dependency on k and l being intended to emphasize that each channel frequency response estimate is determined for the k-th OFDM subcarrier/l-th OFDM symbol. Similarly to the notation of above, $\hat{H}_2$ (without the dependency on any specific k-th OFDM subcarrier/l-th OFDM symbol) is the channel frequency response estimate associated with the useful signal component estimate $\hat{r}_u$ (i.e. r''=$\hat{r}_u$), such as when the receiver 200 takes the detection scheme $200_E$—in fact, as better discussed in the following, when the receiver 200 takes the detection scheme $200_E$ all the A-th OFDM subcarriers/l-th OFDM symbols are considered concurrently.

Preferably, as illustrated, the determination (by the channel estimation unit $210_2$) of only the channel frequency response estimate $\hat{H}_2(k,l)$, of only the channel frequency response estimate $\hat{H}_2$ or of both the channel frequency response estimates $\hat{H}_2(k,l)$, $\hat{K}_2(k,l)$ is enabled by respective values of a control signal $S_{210,2}$ received at the channel estimation unit $210_2$ (e.g., from the control unit CU of the receiver 200, as better discussed below).

The channel estimation unit $210_2$ is advantageously configured to provide the channel frequency response estimate $\hat{H}_2$ (k,l) or the channel frequency response estimates $\hat{H}_2$ (k,l), $\hat{K}_2$ (k,l) or the channel frequency response estimate $\hat{H}_2$ (depending on the selected decoding scheme taken by the receiver 200) to the demodulation unit $205_2$, whereby the demodulation unit $205_2$ is advantageously configured to determine the soft encoded bits LLR(u) or the soft encoded bits LLR(u)* accordingly.

As visible in the figure, the receiver 200 preferably comprises a buffer unit 225 (or more thereof) for receiving the soft encoded bits LLR(u) or the soft encoded bits LLR(u)* from the demodulation unit $205_2$, and a decoding or detection unit 230 (e.g., a turbo decoding unit in the considered example of LTE-LTE-A technology, preferably including soft-in/soft-out channel decoding algorithms, such as SOVA (Soft Output Decoding Algorithm)) for receiving the soft encoded bits LLR(u) or the soft encoded bits LLR(u)* from the buffer unit 225 and for providing an estimate (preferably LLR ("Log Likelihood Ratio")-based) of (i.e. for detecting) the associated information bits (hereinafter, soft bits) LLR(u)'.

Preferably, decoding or detection of the soft encoded bits LLR(u)* is performed based on all the soft encoded bits LLR(u)* determined for the plurality of signal components r*, with the buffer unit that is advantageously configured to store the soft encoded bits LLR(u)* until all the soft encoded bits LLR(u)* for all the signal components r* have been determined.

In other words, as herein assumed, the buffer unit 225 is configured to store the soft encoded bits LLR(u)* before feeding them to the decoding unit 230; more preferably, the buffer unit 225 is prevented or allowed to feed the soft encoded bits LLR(u)* to the decoding unit 230 based on respective values of a control signal $S_{225}$ (the control signal $S_{225}$ being for example received at the buffer unit 225, preferably from the control unit CU of the receiver 200, as better discussed below).

As visible in the figure, the receiver 200 preferably comprises a further regeneration unit $215_2$. Preferably, although not necessarily, the regeneration unit $215_2$ is analogous to the regeneration unit $215_1$, the regeneration units $215_1$, $215_2$ being for example physically separate units (as herein illustrated) or logically separate units formed in a single physical unit and individually selectable to be operated.

The regeneration unit $215_2$ is preferably configured to receive the soft bits LLR(u)' from the decoding unit 230 and to provide the regenerated useful signal estimate $\tilde{r}_u$ to the subtraction unit $220_1$ (when the selected detection scheme of the receiver 200 provides for it, such as when the detection scheme $200_E$ is selected)—with the reception of the soft bits LLR(u)' at the regeneration unit $215_2$ that, as will be better discussed here below, is advantageously performed by properly controlling a switching unit placed between the decoding unit 230 and the regeneration unit $215_2$.

As mentioned above, the receiver 200 advantageously comprises a switching unit $235_1$, e.g. placed between the subtraction unit $220_2$ and the demodulation unit $205_2$, and a further switching unit $235_2$, e.g. placed between the decoding unit 230 and the regeneration unit $215_2$—however, in embodiments of the present invention the switching unit $235_1$ and/or the switching unit $235_2$ may be merely logical entities physically implemented in any other suitable manner.

Preferably, as illustrated, the switching unit $235_1$ is configured to be switched between a first configuration (for example selectable upon a first logical value of a respective control signal $S_{235,1}$, preferably provided by the control unit CU of the receiver 200) in which the demodulation unit $205_2$ receives the useful signal estimate $\hat{r}_u$ (e.g., when any one of the detection scheme $200_E$ is selected) or the useful signal component estimate $\hat{r}_u^*$ (e.g., when the detection scheme $200_D$ is selected), a second configuration (for example selectable upon a second logical value of the respective control signal $S_{235,1}$) in which the demodulation unit $205_2$ receives the signal component r* (e.g., when any of detection schemes $200_B$ and $200_C$ is selected), and a third or floating configuration (shown in FIG. 2A) in which no signal (and, hence, none among the useful signal estimate $\hat{r}_u$, the useful signal component estimate $\hat{r}_u^*$ and the signal component r*) is received at the demodulation unit $205_2$ (as better discussed below, the switching unit $235_1$ takes the floating configuration during the preliminary phase of the detection process). To this purpose, the switching unit $235_1$ may advantageously be implemented as a "Single Pole, Centre Off" (SPCO) or "Single Pole, Triple Throw" switch, or with a proper combination of "Single Pole, Double Throw" (SPDT) switches.

Preferably, as illustrated, the switching unit $235_2$ is configured to be switched between a first or closed configuration (for example selectable upon a first logical value of a respective control signal $S_{235,2}$, preferably provided by the control unit CU of the receiver 200) in which the regeneration unit $215_2$ receives the soft bits LLR(u)' (e.g., when the detection scheme $200_E$ is selected), and a second or open configuration (for example selectable upon a second logical value of the control signal $S_{235,2}$) in which the soft bits LLR(u)' are prevented from being fed to the regeneration unit $215_2$ (e.g., when any one of the detection schemes $200_B$-$200_D$ is selected).

As mentioned above, the receiver 200 preferably comprises a control unit CU for controlling the operation of the receiver 200.

For the purposes of the present disclosure, the control unit CU is preferably configured to determine the interference metric [ ](k,l) (e.g., by means of the processing module PM thereof), and to determine and select the detection scheme of the receiver 200 accordingly. As better discussed here below, the determination of the detection scheme is preferably based on a comparison between the interference metric β(k,l) and one or more interference metric threshold values, whereas the selection of the detection scheme is preferably performed by setting the proper logical values of the control signals $S_{210,1}, S_{210,2}, S_{225}, S_{235,1}, S_{235,2}$ according to a result of such a comparison. As mentioned above, the determination of the detection scheme is more generally based on a comparison between the level of interference experienced by each signal component r* determined by control unit CU and one or more threshold interference values or levels: as should be readily understood, in the exemplary discussed embodiment in which the interference metric β(k,l) is taken into consideration, and in which, for the way the interference metric β(k,l) has been exemplary defined, an inverse proportionality exists between the interference metric β(k,l) and the level of interference, the interference metric threshold value(s) and the interference threshold value(s) are also in inverse proportionality with each other.

According to an embodiment of the present invention, the interference metric threshold values comprise a first interference metric threshold value $\beta_L$. (hereinafter referred to as lower interference metric threshold value) and a second interference metric threshold value $\beta_H$ (hereinafter referred to as upper interference metric threshold value). According to a general embodiment of the present invention, the interference threshold values comprise a first interference threshold value $T_L$. (hereinafter referred to as lower interference threshold value) and a second interference threshold value $T_H$ (hereinafter referred to as upper interference threshold value)—with the lower interference metric threshold value $\beta_L$ and the upper interference threshold value $T_H$ that denote a high (or relatively high) level of interference and with the upper interference metric threshold value $\beta_H$ and the lower interference threshold value $T_L$ that denote a low (or relatively low) level of interference. By a functional and conceptual standpoint (and, as herein illustrated, even by a physical standpoint), the comparison operations are performed at a comparison module COMP of the control unit CU, the comparison module COMP for example receiving the interference metric $\beta(k,l)$ and the lower $\beta_L$ and upper $\beta_H$ interference metric threshold values (or, equivalently, the lower $T_L$ and upper $T_H$ interference threshold values), and advantageously providing the control signals $S_{210,1}$, $S_{210,2}$, $S_{225}$, $S_{235,1}$, $S_{235,2}$.

According to an embodiment of the present invention, the lower $\beta_L$ and upper PH interference metric threshold values (or, equivalently, the lower $T_L$ and upper $T_H$ interference threshold values) are set by the network node 105 and communicated to the user equipment 110, e.g. by means of system information and/or dedicated signalling. According to an alternative embodiment of the present invention, the user equipment 110 (e.g., the respective receiver 200) is configured to autonomously set the lower $\beta_L$ and upper $\beta_H$ interference metric threshold values (or, equivalently, the lower $T_L$ and upper $T_H$ interference threshold values), e.g. based on a cost function (for example, associated with service characteristics, such as latency) and/or on receiver characteristics (including, but not limited to, available processing capability and battery level).

In the following, the detection schemes $200_B$-$200_E$ will be discussed jointly with FIG. 3, which schematically shows an activity diagram of a detection process 300 carried out by the receiver 200 (for example under the control of the control unit CU) according an embodiment of the present invention.

The detection process 300 preferably starts by carrying out the above-mentioned preliminary phase aimed at determining the detection scheme of the receiver 200, among the detection schemes $200_B$-$200_D$—action nodes 305-315. In the preferred embodiment herein considered, the preliminary phase and the following operations in the selected detection scheme (see alternative action nodes $200_B$-$200_D$) are performed, at least logically, for each signal component r* at a time (i.e., on each single signal component r*), it being understood that, physically, the units of the receiver 200 could be configured to operate on all the signal components r* (or on at least a subset thereof) concurrently.

Preferably, the detection process 300 (and, particularly, its preliminary phase) comprises, for each signal component r
  determining, preferably at the channel estimation unit $210_1$, the channel frequency response estimates $\hat{H}_1(k,l)$, $\hat{K}_1(k,l)$ associated with that signal component r* (action 305). In order to achieve it, the control signal $S_{210,1}$ is preferably set by the control unit CU at the corresponding logical value that enables the channel estimation unit $210_1$ to determine both the channel frequency response estimate $\hat{H}_1(k,l)$ and the channel frequency response estimate $\hat{K}_1(k,l)$ (as discussed above);
  determining, preferably at the processing module PU of the control unit CU, the interference metric $\beta(k,l)$ based on the channel frequency response estimates $\hat{H}_1(k,l)$, $\hat{K}_1(k,l)$ (action node 310), and
  comparing, preferably at the comparing module COMP of the control unit CU, the interference metric $\beta(k,l)$ to the lower $\beta_L$ and upper $\beta_H$ interference metric threshold values (action node 315).

Preferably, in order to avoid unnecessary processing by the receiver 200 during the preliminary phase, the control signals $S_{235,1}$, $S_{235,2}$ are preferably set by the control unit CU at the corresponding logical values that determine the switching unit $235_1$ in the floating configuration (which essentially avoids processing by the demodulation unit $205_2$, the channel estimation unit $210_2$, the buffer unit 225 and the decoding unit 230) and the switching unit $235_2$ in the open configuration (which essentially avoids processing by the regeneration unit $215_2$ and the subtraction unit $220_1$)—the logical values of the control signals $S_{210,2}$, $S_{225}$ instead making essentially no difference, in that no signal is received at channel estimation unit $210_2$ and at the buffer unit 225 due to the floating configuration of the switching unit $235_1$.

Back to the detection process 300, depending on the outcome of the comparison between the interference metric $\beta(k,l)$ and the lower $\beta_L$ and upper $\beta_H$ interference metric threshold values, the following (alternative) three scenarios could arise (each one preferably resulting in the selection of a corresponding detection scheme of the receiver 200).

If $\beta(k,l) > \beta_H$, see branch (i) of the detection process 300, the signal component r has a low, or relatively low, level of interference (i.e., the level of interference is below the lower interference threshold value $T_L$). According to an embodiment of the present invention, in this scenario the control unit CU is configured to select the detection scheme $200_B$—action node $320_B$.

In the preferred, not limiting, embodiment herein considered, in the detection scheme $200_B$:
  the demodulation unit $205_1$, the channel estimation unit $210_1$, the regeneration unit $215_1$ and the subtraction unit $220_2$ are preferably inactive (or disabled); this is preferably achieved by setting the control signal $S_{235,1}$ at the corresponding logical value that determines the switching of the switching unit $235_1$ from the floating configuration to the second configuration. The signal component r is therefore (e.g., directly) fed to the demodulation unit $205_2$ (thus substantially bypassing the demodulation unit $205_1$/channel estimation unit $210_1$/regeneration unit $215_1$/subtraction unit $220_2$ path), whereby the corresponding soft encoded bits LLR*(u) from the demodulation unit $205_2$ are preferably fed to the buffer unit 225. As mentioned above, the demodulation unit $205_2$ for demodulating the useful signal component $r_u^*$ of the signal component r* may for example be an Alamouti decoding algorithm followed by a symbol-to-bit demapping algorithm (e.g., in case of Transmit Diversity (TM2)) or a QRD-M algorithm (e.g., in case of Spatial Multiplexing (TM3)) with $L_U$ stages ($L_U$ being the number of spatial data streams associated with the useful signal component $r_u^*$);
  the regeneration unit $215_2$ and the subtraction unit $220_1$ are preferably inactive (or disabled); this is preferably achieved by setting the control signal $S_{235,2}$ at the corresponding logical value that determines the switching of the switching unit $235_2$ to the open configuration (in the example at issue in which the switching unit $235_2$ is in the open configuration even during the preliminary phase of the detection process 300, no change to the logical value of the control signal $S_{235,2}$ is advantageously required);

the decoding unit 230 is preferably inactive (or disabled); this is preferably achieved by setting the control signal $S_{225}$ at the corresponding logical value that prevents the buffer unit 225 from feeding the soft encoded bits LLR*(u) to the decoding unit 230 (at this logical level of the control signal $S_{225}$ the buffer unit 225 being therefore configured to store the received soft encoded bits LLR*(u));

r"=r*, i.e. the channel estimation unit $210_2$ is preferably configured to (e.g., directly) receive the signal component r*, to determine the channel frequency response estimate $\hat{H}_2(k,l)$ associated with the useful signal component $r_u$* (as mentioned above, the determination by the channel estimation unit $210_2$ of only the channel frequency response estimate $\hat{H}_2(k,l)$ being enabled by a respective value of the control signal $S_{210,2}$ set by the control unit CU), and to determine, based on the channel frequency response estimate $\hat{H}_2(k,l)$, the soft encoded bits LLR*(u) associated with the useful signal component $r_u$*. As no channel frequency response estimate $\hat{K}_2(k,l)$ associated with the interfering signal component $r_i$* have to be determined at the channel estimation unit $210_2$, and hence no interference cancellation and suppression is required for the interference signal component $r_i$*, the detection scheme $200_B$ provides for no enabling of NAICS technology, and particularly no NAICS signalling exchange between the demodulation unit $205_2$ and the network node 105 is required (thus unloading or unburdening the receiver 200 from signal processing).

Therefore, as mentioned above, in the detection scheme $200_B$, the soft encoded bits LLR*(u) are determined without any estimate and cancellation of the interfering signal component $r_i$* (i.e., without determining the soft encoded bits LLR*(i), the regenerated interfering signal component $\tilde{r}_i$* and the useful signal component estimate $\hat{r}_u$*); in fact, since the signal component r (or, equivalently, the k-th OFDM subcarrier/l-th OFDM symbol) has a low, or relatively low, level of interference, detection and regeneration of the interference signal component $r_i$* could be not sufficiently accurate, which would cause a degradation of the performance for the useful signal component $r_u$* (e.g., in terms of measured throughput).

Back to the detection process 300, if $\beta_L < \beta(k,l) < \beta_H$, see branch (ii) of the detection process 300, the signal component r* has a medium or intermediate level of interference (i.e., the level of interference is between the lower $T_L$ and upper $T_H$ interference threshold values). According to an embodiment of the present invention, in this scenario the control unit CU is configured to select the detection scheme $200_C$—action node $320_C$.

In the preferred, not limiting, embodiment herein considered, in the detection scheme $200_C$:

the demodulation unit $205_1$, the channel estimation unit $210_1$, the regeneration unit $215_1$ and the subtraction unit $220_2$ are preferably inactive (or disabled); this is preferably achieved by setting the control signal $S_{235,1}$ at the corresponding logical value that determines the switching of the switching unit $235_1$ from the floating configuration to the second configuration. The signal component r* is therefore (e.g., directly) fed to the demodulation unit $205_2$ (thus substantially bypassing the demodulation unit $205_1$/channel estimation unit $210_1$/regeneration unit $215_1$/subtraction unit $220_2$ path), whereby the corresponding soft encoded bits LLR*(u) from the demodulation unit $205_2$ are preferably fed to the buffer unit 225. The demodulation unit $205_2$ for demodulating the useful signal component $r_u$* may for example be an Alamouti decoding algorithm followed by a symbol-to-bit demapping algorithm (e.g., in case of Transmit Diversity (TM2)) or a QRD-M algorithm (e.g., in case of Spatial Multiplexing (TM3)) with $L=L_U+L_I$ stages ($L_I$ and $L_I$ being the number of spatial data streams associated with the useful $r_u$* and interfering $r_i$* signal components, respectively), wherein the soft encoded bits associated with the interfering signal component $r_i$* (so determined at the demodulation unit $205_2$) that, although not used in the following units of the receiver 200, advantageously contribute to improve the demodulation of the useful signal component $r_u$* to obtain the soft encoded bits LLR*(u);

the regeneration unit $215_2$ and the subtraction unit $220_1$ are preferably inactive (or disabled); this is preferably achieved by setting the control signal $S_{235,2}$ at the corresponding logical value that determines the switching of the switching unit $235_2$ to the open configuration (in the example at issue in which the switching unit $235_2$ is in the open configuration even during the preliminary phase of the detection process 300, no change to the logical value of the control signal $S_{235,2}$ is required);

the decoding unit 230 is preferably inactive (or disabled); this is preferably achieved by setting the control signal $S_{225}$ at the corresponding logical value that prevents the buffer unit 225 from feeding the soft encoded bits LLR*(u) to the decoding unit 230 (at this logical level of the control signal $S_{225}$ the buffer unit 225 being therefore configured to store the received soft encoded bits LLR*(u));

r"=r*, i.e. the channel estimation unit $210_2$ is preferably configured to (e.g., directly) receive the signal component r*, to determine both the channel frequency response estimate $\hat{H}_2(k,l)$ associated with the useful signal component $r_u$* and the channel frequency response estimate $\hat{K}_2(k,l)$ associated with the interfering signal component $r_L$* (as mentioned above, the determination by the channel estimation unit $210_2$ of both channel frequency response estimates $\hat{H}_2(k,l)$, $\hat{K}_2(k,l)$ being enabled by a respective value of the control signal $S_{210,2}$ set by the control unit CU), and to determine, based on the channel frequency response estimates $\hat{H}_2(k,l)$, $\hat{K}_2(k,l)$, the soft encoded bits LLR*(u) associated with the useful signal component $r_u$*. As the channel frequency response estimate $\hat{K}_2(k,l)$ associated with the interfering signal component $r_i$* is advantageously determined at the channel estimation unit $210_2$, but no interference cancellation and suppression is required for the interference signal component $r_i$* (indeed, the soft encoded bits LLR*(u) from the demodulation unit $205_2$ are the soft encoded bits associated with the useful signal component $r_u$*), the detection scheme $200_C$ provides for a partial enabling of NAICS signalling, e.g. an exchange of NAICS signalling including a subset of the transmission information. According to an embodiment of the present invention, the subset of the transmission information may for example comprise information about (such as position of) the reference signals of the interfering network node or of the interfering user equipment.

Therefore, in the detection scheme $200_C$, the soft encoded bits LLR*(u) are determined without any estimate and cancelation of the interfering signal component $r_i^*$ (i.e., without determining the soft encoded bits LLR*(i), the regenerated interfering signal component $\tilde{r}_i^*$ and the useful signal component estimate $\hat{r}_u^*$); in fact, since the signal component r* has a medium level of interference, detection and regeneration of the interference signal component $r_i^*$ could be not sufficiently accurate, which would cause a degradation of the performance for the useful signal component $r_u^*$ (e.g., in terms of measured throughput).

As should be noticed, detection schemes $200_B$ and $200_C$ are structurally analogous to each other; however, in the detection scheme $200_B$ no NAICS signalling is received at (and exploited by) the demodulation unit $205_2$, whereas in the detection scheme $200_C$ a partial NAICS signalling is received at (and exploited by) the demodulation unit $205_2$.

Back to the detection process 300, if $\beta(k,l)<\beta_L$, see branch (iii) of the detection process 300, the signal component r* has a high (or relatively high) level of interference (i.e., the level of interference is higher than the upper interference threshold value $T_H$). According to an embodiment of the present invention, in this scenario the control unit CU is configured to select the detection scheme $200_D$—action node $320_D$.

In the preferred, not limiting, embodiment herein considered, in the detection scheme $200_D$:

the demodulation unit $205_1$, the channel estimation unit $210_1$, the regeneration unit $215_1$ and the subtraction unit $220_2$ are preferably active (or enabled); this is preferably achieved by setting the control signal $S_{235,1}$ at the corresponding logical value that determines the switching of the switching unit $235_1$ from the floating configuration to the first configuration (thus substantially enabling the demodulation unit $205_1$/channel estimation unit $210_1$/regeneration unit $215_1$/subtraction unit $220_2$ path). The signal component r* is therefore (e.g., directly) fed to the demodulation unit $205_1$, the soft encoded bits LLR*(i) from the demodulation unit $205_1$ are fed to regeneration unit $215_1$, the regenerated interfering signal component $\tilde{r}_i^*$ from the regeneration unit $215_1$ is fed to the subtraction unit $220_2$, and the useful signal component estimate $f_u^*$ from the subtraction unit $220_2$ is fed to the demodulation unit $205_2$ and to the channel estimation unit $210_2$ (r"=$\hat{r}_u^*$), as discussed here below. As mentioned above, the demodulation unit $205_1$ for demodulating the interfering signal component $r_i^*$ may for example be an Alamouti decoding algorithm followed by a symbol-to-bit demapping algorithm (e.g., in case of Transmit Diversity (TM2)) or a QRD-M algorithm (e.g., in case of Spatial Multiplexing (TM3)) with $L=L_I+L_U$ stages ($L_I$ and $L_U$ being the number of spatial data streams associated with the interfering $r_i^*$ and useful $r_u^*$ signal components, respectively), with the soft encoded bits of the useful signal component $r_u^*$ (so determined at the demodulation unit $205_1$) that, although not used in the following units of the receiver 200, may advantageously contribute to improve the demodulation of the interfering signal component $r_i^*$ to obtain the soft encoded bits LLR*(i);

the regeneration unit $215_2$ and the subtraction unit $220_1$ are preferably inactive (or disabled); this is preferably achieved by setting the control signal $S_{235,2}$ at the corresponding logical value that determines the switching of the switching unit $235_2$ to the open configuration (in the example at issue in which the switching unit $235_2$ is in the open configuration even during the preliminary phase of the detection process 300, no change to the logical value of the control signal $S_{235,2}$ is advantageously required);

the decoding unit 230 is preferably inactive (or disabled); this is preferably achieved by setting the control signal $S_{225}$ at the corresponding logical value that prevents the buffer unit 225 from feeding the soft encoded bits LLR*(u) to the decoding unit 230 (at this logical level of the control signal $S_{225}$ the buffer unit 225 being therefore configured to store the received soft encoded bits LLR* (u);

r"=$\hat{r}_u^*$, i.e. the channel estimation unit $210_2$ is preferably configured to receive the useful signal component estimate $\hat{r}_u^*$ and to determine the channel frequency response estimate $\hat{H}_2(k,l)$ associated with the useful signal component estimate $\hat{r}_u^*$ (as mentioned above, the determination by the channel estimation unit $210_2$ of only the channel frequency response estimate $\hat{H}_2(k,l)$ being enabled by a respective value of the control signal $S_{210,2}$ set by the control unit CU), and the demodulation unit $205_2$ is configured to receive the useful signal component estimate $\hat{r}_u^*$ and to determine, preferably based on the channel frequency response estimate $\hat{H}_2(k,l)$, the soft encoded bits LLR*(u) associated with the useful signal component estimate $\hat{r}_u^*$, whereby the corresponding soft encoded bits LLR*(u) from the demodulation unit $205_2$ are preferably fed to the buffer unit 225. As mentioned above, the demodulation unit $205_2$ for demodulating the useful signal component estimate $\hat{r}_u^*$ may for example be an Alamouti decoding algorithm followed by a symbol-to-bit demapping algorithm (e.g., in case of Transmit Diversity (TM2)) or a QRD-M algorithm (e.g., in case of Spatial Multiplexing (TM3)) with $L_U$ stages ($L_U$ being the number of spatial data streams associated with the useful signal component estimate $\hat{r}_u^*$).

As the channel frequency response estimate $\hat{K}_1(k,l)$ associated with the interfering signal component $r_i^*$ has to be determined at the channel estimation unit $210_1$, and interference cancellation and suppression is required for the interference signal component $r_i^*$ (indeed, the soft encoded bits LLR*(i) from the demodulation unit $205_1$ are the soft encoded bits associated with the interfering signal component $r_i^*$), the detection scheme $200_D$ provides for a full enabling of NAICS signalling, e.g. an exchange of NAICS signalling including all (or at least a relevant number of) the transmission information.

Therefore, in the detection scheme $200_D$, the soft encoded bits LLR*(u) are determined with an estimate and cancelation of the interfering signal component $r_i^*$ (i.e., by determining the soft encoded bits LLR*(i), the regenerated interfering signal component $\tilde{r}_i^*$, and the useful signal component estimate $\hat{r}_u^*$); in fact, since the considered signal component r* (or, equivalently, the considered OFDM sub-carrier/OFDM symbol) has a high level of interference, detection and regeneration of the interference signal component $r_i^*$ is expected to be accurate.

Although in the foregoing two interference metric threshold values $\beta_L$, $\beta_H$ or, equivalently, two interference threshold values $T_L$, $T_H$, and three alternative scenarios have been exemplary considered, this should not be construed limitatively. In fact, in basic implementations of the present invention, a single interference metric threshold value (or, equivalently, a single interference threshold value) and two alternative scenarios may be taken into consideration: just as an example, if the interference level experienced by the considered signal component r* is higher than said single interference threshold value (it meaning that the the signal component r* has a high (or relatively high) level of interference), then the detection scheme $200_D$ may be selected (and, hence, similarly to the above, NAICS signalling is preferably fully enabled), whereas if the interference level experienced by the considered signal component r* is lower than said single interference threshold value (it meaning that the the signal component r* has a low (or relatively low) level of interference), then the detection scheme $200_B$ or the detection scheme $200_C$ may be selected (with the selection of the detection scheme $200_B$ or of the detection scheme $200_C$ that essentially depends on the benefit of respectively disabling or partially enabling NAICS signalling, which in turn may depend on said single interference threshold value).

As should be noticed, in the above inequalities (i.e., $\beta(k,l)<\beta_L$, $\beta_L<\beta(k,l)<\beta_H$ and $\beta(k,l)>\beta_H$), the borderline case in which the interference metric $\beta(k,l)$ is exactly equal to the lower interference metric threshold value $\beta_L$ or to the upper interference metric threshold value $\beta_H$ (or, equivalently, the borderline case in which the level of interference is exactly equal to the lower interference threshold value $T_L$ or to the upper interference threshold value $T_h$) has not been made explicit (in fact, this borderline case is so unusual that it is practically very unlikely); however, according to design options, the above inequalities may be reformulated as $\beta(k,l) \leq \beta_L$ or $\beta(k,l) \geq \beta_H$.

As discussed above, the action nodes 305,310,315 and $320_B/320_C/320_D$ involve processing on each signal component r (or, equivalently, at OFDM subcarrier/OFDM symbol level), and they are advantageously repeated or reiterated for each signal component r until all the signal components r have been distinctly processed (and the respective soft encoded bits LLR*(u) determined). This is conceptually represented in FIG. 3 by loop connection between a decision node 325 (aimed at checking whether the current signal component r* is the last signal component r*) and action node 305.

Particularly, if the current signal component r* is not the last signal component r* to be processed (exit branch N of the decision node 325), it meaning that unprocessed signal components r* still exist, a new (unprocessed) signal component r* of the plurality of signal components r* of the modulated signal r is selected (not shown), and the nodes 305-325 are repeated as such for that signal component r*. If, instead, the current signal component r is the last signal component r* to be processed (exit branch Y of the decision node 325), it meaning that all the signal components r* of the modulated signal r have been processed (and the respective soft encoded bits LLR* (u) have been determined), decoding of the soft encoded bits LLR*(u) (associated with all the signal components r*) stored in the buffer unit 225 is performed at the decoding unit 230—action node 330.

This is preferably achieved by setting the control signal $S_{225}$ at the corresponding logical value that allows the buffer unit 225 to feed the soft encoded bits LLR*(u) to the decoding unit 230. Preferably, as herein assumed, during the decoding of the soft encoded bits LLR*(u) the control signals $S_{210,1}, S_{210,2}, S_{235,1}, S_{235,2}$ are unchanged, i.e. they are kept at the same logical levels set upon selection of the detection scheme $200_B/200_C/200_D$ and during operation thereof.

According to an embodiment of the present invention, channel decoding also comprises an error-detecting check on the resulting soft bits LLR(u)', preferably based on a "Cyclic Redundancy Check" (hereinafter, CRC check)—decision node 335. If the CRC check is successful, exit branch Y of decision node 335, it meaning for example that no detection errors have occurred at the detection unit 230, the detection process 300 for the modulated signal r is accomplished (and ends), and a new detection process may be started for the next (received) modulated signal. Conversely, if the CRC check fails, exit branch N of the decision node 335, it meaning for example that one or more detection errors have occurred at the detection unit 230, the control unit CU is preferably configured to select the detection scheme $200_E$ (action node 340), which advantageously represents a last attempt to recover the transmitted data block before sending a retransmission request. In alternative embodiments of the present invention, other error-detecting approaches may be used alternatively to CRC check; if error-detecting approaches are used which allow determining a number of detection errors, the exit branch Y of decision node 335 would be active if, for example, a number of detection errors below a predetermined number of detection errors have occurred at the detection unit 230, whereas the exit branch N of the decision node 335 would be active if, for example, a number of detection errors above the predetermined number of detection errors have occurred at the detection unit 230.

The detection scheme $200_E$ is preferably applied to the whole set of the signal components r*, and hence to the modulated signal r as a whole.

In the preferred (not limiting) embodiment herein considered, in the detection scheme $200_E$ the demodulation units $205_1, 205_2$, the channel estimation units $210_1, 210_2$ the regeneration units $215_1, 215_2$, the subtraction units $220_1, 220_2$, the buffer unit 225 and the decoding unit 230 are preferably all active (or enabled); this is preferably achieved by setting the control signal $S_{235,1}$ at the corresponding logical value that determines the switching of the switching unit $235_1$ to the first configuration (thus substantially enabling the demodulation unit $205_1$/channel estimation unit $210_1$/regeneration unit $215_1$/subtraction unit $220_2$ path), and by setting the control signal $S_{235,2}$ at the corresponding logical value that determines the switching of the switching unit $235_2$ to the closed configuration (thus substantially enabling the regeneration unit $215_2$/subtraction unit $220_1$ path)—the control signal $S_{225}$ being instead kept at the corresponding logical value that allows feeding the soft encoded bits LLR(u) to the decoding unit 230.

In the detection scheme $200_E$, the soft bits LLR(u)' associated with the whole set of signal components r are fed to the regeneration unit $215_2$, the resulting regenerated useful signal $\tilde{r}_u$ is fed to the subtraction unit $220_1$ to be subtracted from the modulated signal r, the resulting interfering signal estimate $\hat{r}_i$ is fed to the demodulation unit $205_1$ (which, similarly to the above, may for example be an Alamouti decoding algorithm followed by a symbol-to-bit demapping algorithm (e.g., in case of Transmit Diversity (TM2)) or a QRD-M algorithm (e.g., in case of Spatial Multiplexing (TM3)) with $L=L_1$ stages), the resulting soft encoded bits LLR(i) are fed to the regeneration unit $215_1$, the resulting regenerated interfering signal $\tilde{r}_i$ is fed to the subtraction unit $220_2$ to be subtracted from the modulated signal r, the resulting useful signal estimate $\hat{r}_u$ is fed to the demodulation unit $205_2$ (which, similarly to the above, may for example be an Alamouti decoding algorithm followed by a symbol-to-bit demapping algorithm (e.g., in case of Transmit Diversity (TM2)) or a QRD-M algorithm (e.g., in case of Spatial Multiplexing (TM3)) with $L=L_U$ stages), and the resulting soft encoded bits LLR(u) are fed to the decoding unit 230 (e.g., passing through the buffer unit 225).

Preferably, as conceptually illustrated in FIG. 3 by loop connection between the action node 340 and the decision node 335, if the CRC check at the decoding unit 230 is successful the detection process 300 is accomplished (and ends), whereas if the CRC check fails the resulting soft bits LLR(u)' are fed again to the regeneration unit $215_2$ for starting a new iteration with the detection scheme $200_E$—preferably, although not shown, nodes 335 and 340 are repeated or reiterated until a predefined number of iterations is reached.

As visible in FIG. 2E, the interfering signal estimate $\hat{r}_i$ is preferably fed also to the channel estimation unit $210_1$, which in turn is advantageously enabled by the control unit CU (e.g., by setting the proper logical value of the control signal $S_{210,1}$) to determine the channel frequency response estimate $\hat{K}_1$ associated with it—with the demodulation unit $205_1$ that is advantageously configured to determine the soft encoded bits LLR(i) based on the channel frequency response estimate $\hat{K}_3$. In this case, NAICS signalling between the demodulation unit $205_1$ and the network node 105 is preferably fully enabled, so as to improve demodulation at the demodulation unit $205_1$.

As visible in FIG. 2E, the useful signal estimate $\hat{r}_u$ is preferably fed also to the channel estimation unit $210_2$, which in turn is advantageously enabled by the control unit CU (e.g., by setting the proper logical value of the control signal $S_{210,2}$) to determine the channel frequency response estimate $\hat{H}_2$ associated with the useful signal estimate $\hat{r}_u$—with the demodulation unit $205_2$ that is advantageously configured to determine the soft encoded bits LLR(u) based on the channel frequency response estimate $\hat{H}_2$. In this case, NAICS signalling between the demodulation unit $205_2$ and the network node 105 is preferably disabled, in that useful signal estimate $\hat{r}_u$ is a signal already resulting from interference cancellation and suppression.

As should be understood, in the detection scheme $200_E$ the iterative determination of the channel frequency response estimates $\hat{K}_1$ and $\hat{H}_2$ is not necessary, however it is an advantageous option: in fact, even the channel frequency response estimates $\hat{K}_1$ and $\hat{H}_2$ may benefit from cancellation of, respectively, the useful and interfering signal, whereby the determination (and hence updating) the channel frequency response estimates $\hat{K}_1$ and $\hat{H}_2$ at each iteration may improve the possibility of correctly decoding the information bits carried on the modulated signal r without retransmission requests—with the possibility of determining the channel frequency response estimates $\hat{K}_1$ and $\hat{H}_2$ at each iteration that may for example depend on the processing capabilities of the receiver 200, and hence it could be purposely limited with respect to the predetermined number of iterations (for example, by allowing the channel frequency response estimates $\hat{K}_1$ and $\hat{H}_2$ every two or three iterations carried out by the receiver 200 when the detection scheme $200_E$ is selected).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, analogous considerations apply if the receiver has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

In addition, although explicit reference has been made to wireless communication network based on the LTE/LTE-Advanced standard, it should be understood that it is not in the intentions of the Applicant to be limited to the implementation of any particular wireless communication network architecture or protocol.

Moreover, the present invention lends itself to be implemented through an equivalent method (by using similar steps, removing some steps being not essential, or adding further optional steps). Moreover, the steps may be performed in different order, concurrently or in an interleaved way (at least partly).

The invention claimed is:

1. A receiver for receiving a modulated signal including useful and interfering signals and for detecting information bits carried thereon, wherein the modulated signal comprises a plurality of signal components each one associated with a respective modulation subcarrier and including respective useful and interfering signal components, the receiver performing a method comprising:
providing, for each signal component, a respective first useful signal component estimate indicative of the useful signal component of that signal component;
providing, for each signal component, a respective second useful signal component estimate indicative of the useful signal component of that signal component;
estimating, for each signal component, a first channel frequency response associated with the respective useful signal component and a second channel frequency response associated with the respective interfering signal component;
determining, for a first signal component, an interference level experienced by the first signal component according to the respective first and second channel frequency responses, wherein the interference level experienced by the first signal component is between a further threshold interference level and a threshold interference level, the further threshold interference level being lower than the threshold interference level;
providing, for the first signal component, the respective second useful signal component estimate by allowing demodulation of the first signal component based on a subset of received transmission information associated with the modulated signal; and allowing detection of the information bits carried on the modulated signal according to the second useful signal component estimates provided for the plurality of signal components.

2. The receiver according to claim 1, wherein the receiver supports Network Assisted Interference Cancellation and Suppression signaling for receiving the transmission information associated with the modulated signal.

3. The receiver according to claim 2, wherein the transmission information comprises one or more of the following: information on allocated radio resources, modulation and coding scheme, scrambling sequence, transmission technique precoding vector or matrix, and reference signals of an interfering network node or of an interfering user equipment.

4. The receiver of claim 1, wherein the receiver further performs:
determining, for a second signal component, an interference level experienced by the second signal component according to the respective first and second channel frequency responses, wherein the interference level experienced by the second signal component is higher than the threshold interference level; and
providing the respective second useful signal component estimate from the first useful signal component estimate provided for the second signal component.

5. The receiver according to claim 2, wherein the receiver determines for a second signal component, an interference level experienced by the second signal component according to the respective first and second channel frequency responses, wherein the interference level experienced by the second signal component is lower than the further threshold interference level; and
providing the respective second useful signal component estimate by allowing demodulation of the second signal component without the transmission information.

6. The receiver according to claim 2, wherein the receiver further performs:
providing, from the second useful signal component estimates provided for the plurality of signal components, a regenerated useful signal, the regenerated useful signal being a regenerated version of the useful signal included in the modulated signal, wherein in case of a number of detection errors at a detection unit above a predetermined number of detection errors:
feeding the second useful signal component estimates provided for the plurality of signal components to a regeneration unit,
providing a first useful signal estimate associated with the modulated signal based on the modulated signal and on the regenerated useful signal, and
providing a second useful signal estimate indicative of the useful signal of the modulated signal.

7. The receiver according to claim 6, wherein the receiver further performs:
providing, from the modulated signal, an interfering signal estimate indicative of the interfering signal of the modulated signal,
providing the first useful signal estimate based on the interfering signal estimate and on the modulated signal, the interfering signal estimate is provided based on the transmission information.

8. The receiver according to claim 6, wherein the receiver is iteratively configured to:
feed the second useful signal component estimates provided for the plurality of signal components to a regeneration unit,
provide a useful signal estimate associated with the modulated signal based on the modulated signal and on the regenerated useful signal, and
provide a useful signal estimate indicative of the useful signal of the modulated signal,
for a predetermined number of iterations or until the number of detection errors at the detection unit is below the predetermined number of detection errors.

9. The receiver according to claim 1, wherein the receiver further performs:
providing, for each signal component, an interfering signal component estimate indicative of the interfering signal component of that signal component, wherein the respective first useful signal component estimate is provided based on the interfering signal component estimate and on the signal component.

10. A method for receiving a modulated signal including useful and interfering signals and for detecting information bits carried thereon, wherein the modulated signal comprises a plurality of signal components each one associated with a respective modulation subcarrier and including respective useful and interfering signal components, the method comprising:
providing, for each signal component, a respective first useful signal component estimate indicative of the useful signal component of that signal component;
providing, for each signal component, a respective second useful signal component estimate indicative of the useful signal component of that signal component;
estimating, for each signal component, a first channel frequency response associated with the respective useful signal component and a second channel frequency response associated with the respective interfering signal component;
determining, for each signal component, an interference level experienced by that signal component according to the respective first and second channel frequency responses, wherein the interference level is between a threshold interference level and a further threshold interference level, the further threshold interference level being lower than the threshold interference level, and, for each signal component:
providing the respective second useful signal component estimate by allowing demodulation of the signal component based on a subset of received transmission information associated with the modulated signal; and
detecting the information bits carried on the modulated signal according to the second useful signal component estimates provided for the plurality of signal components.

11. The receiver according to claim 1, wherein the receiver further performs:
providing, from the second useful signal component estimates provided for the plurality of signal components, a regenerated useful signal, the regenerated useful signal being a regenerated version of the useful signal included in the modulated signal, wherein in case of a number of detection errors at a detection unit above a predetermined number of detection errors:
feeding the second useful signal component estimates provided for the plurality of signal components to a regeneration unit,
providing a first useful signal estimate associated with the modulated signal based on the modulated signal and on the regenerated useful signal, and providing a second useful signal estimate indicative of the useful signal of the modulated signal.

12. The method of claim 10, wherein receiving the modulated signal is performed by a receiver, and wherein the receiver supports Network Assisted Interference Cancellation and Suppression signaling for receiving the transmission information associated with the modulated signal.

13. The method of claim 12, wherein the transmission information comprises one or more of the following: information on allocated radio resources, modulation and coding scheme, scrambling sequence, transmission technique precoding vector or matrix, and reference signals of an interfering network node or of an interfering user equipment.

14. The method of claim 12, further comprising:
providing, using a regeneration unit and from the second useful signal component estimates provided for the plurality of signal components, a regenerated useful signal, the regenerated useful signal being a regenerated version of the useful signal included in the modulated signal, wherein in case of a number of detection errors being above a predetermined number of detection errors:
feeding the second useful signal component estimates provided for the plurality of signal components to the regeneration unit,
providing, using a first estimation unit, a first useful signal estimate associated with the modulated signal based on the modulated signal and on the regenerated useful signal, and
providing, using a second estimation unit, a second useful signal estimate indicative of the useful signal of the modulated signal.

15. The method of claim 14, wherein the first estimation unit comprises a demodulation unit for providing, from the modulated signal, an interfering signal estimate indicative of the interfering signal of the modulated signal, the first estimation unit being configured to provide the first useful signal estimate based on the interfering signal estimate and on the modulated signal, wherein the demodulation unit provides the interfering signal estimate based on the transmission information.

16. The method of claim 14, further comprising:
feeding the second useful signal component estimates provided for the plurality of signal components to the regeneration unit,
causing the first estimation unit to provide a useful signal estimate associated with the modulated signal based on the modulated signal and on the regenerated useful signal, and
causing the second estimation unit to provide a useful signal estimate indicative of the useful signal of the modulated signal,
for a predetermined number of iterations or until the number of detection errors is below the predetermined number of detection errors.

17. The method of claim 10, further comprising:
providing, for each signal component, an interfering signal component estimate indicative of the interfering signal component of that signal component, wherein the respective first useful signal component estimate is based on the interfering signal component estimate and on the signal component.

18. The method of claim 10, further comprising:
providing, from the second useful signal component estimates provided for the plurality of signal components, a regenerated useful signal, the regenerated useful signal being a regenerated version of the useful signal included in the modulated signal;
identifying that a number of detection errors is above a predetermined number of detection errors;
feeding the second useful signal component estimates provided for the plurality of signal components to a regeneration unit;
providing a first useful signal estimate associated with the modulated signal based on the modulated signal and on the regenerated useful signal; and
providing a second useful signal estimate indicative of the useful signal of the modulated signal.

19. The receiver of claim 1, wherein the receiver further performs:
determining, for a second signal component, an interference level experienced by the second signal component according to the respective first and second channel frequency responses, wherein the interference level experienced by the second signal component is lower than the threshold interference level; and
providing the respective second useful signal component estimate from the second signal component.

20. The receiver according to claim 4, wherein the receiver provides the respective first useful signal component estimate by allowing demodulation of the second signal component based on the transmission information.

* * * * *